United States Patent
Lilliestråle et al.

(10) Patent No.: US 12,420,289 B2
(45) Date of Patent: Sep. 23, 2025

(54) PROCESS FOR REMOVING MICROPOLLUTANTS IN LIQUID OR GAS

(71) Applicant: Radma Carbon AB, Stockholm (SE)

(72) Inventors: Malte Lilliestråle, Stockholm (SE); Radwa Ashour Mahmoud, Stockholm (SE)

(73) Assignee: Radma Carbon AB, Helsingborg (SE)

( * ) Notice: Subject to any disclaimer, the term of this patent is extended or adjusted under 35 U.S.C. 154(b) by 541 days.

(21) Appl. No.: 17/768,253

(22) PCT Filed: Oct. 31, 2020

(86) PCT No.: PCT/EP2020/080610
§ 371 (c)(1),
(2) Date: Apr. 12, 2022

(87) PCT Pub. No.: WO2021/084119
PCT Pub. Date: May 6, 2021

(65) Prior Publication Data
US 2023/0249194 A1    Aug. 10, 2023

(30) Foreign Application Priority Data

Oct. 31, 2019  (SE) .................................. 1951247-4
Mar. 31, 2020  (SE) .................................. 2050365-2

(51) Int. Cl.
*B03C 1/01*  (2006.01)
*B01D 15/38*  (2006.01)
(Continued)

(52) U.S. Cl.
CPC ............ *B03C 1/01* (2013.01); *B01D 15/3885* (2013.01); *B01J 20/20* (2013.01);
(Continued)

(58) Field of Classification Search
CPC ... B03C 1/01; B03C 2201/18; B01D 15/3885; B01J 20/20; B01J 20/28009; C02F 1/008;
(Continued)

(56) References Cited

U.S. PATENT DOCUMENTS 3,803,033 A * 4/1974 Sutherland ......... B01D 21/0012
                                                                210/695
7,722,843 B1 * 5/2010 Srinivasachar .......... B01J 20/02
                                                                 95/137
(Continued)

FOREIGN PATENT DOCUMENTS

DE     102014100849      7/2015
EP       3027562 B1      4/2018
(Continued)

OTHER PUBLICATIONS

Belkouteb et al, Water Research, 182 (2020) 115913, p. 1-10.
(Continued)

Primary Examiner — Youngsul Jeong
(74) Attorney, Agent, or Firm — Welsh IP Law LLC

(57) ABSTRACT

The present disclosure relates to a process, a system and a use for removing micropollutants (1) in liquid (2). The process comprises providing liquid (2) to a container (3) adapted to hold a liquid and/or a gas, providing magnetic activated carbon (4), mixing it, separating the magnetic activated carbon (4) using a magnetic separator (5), removing between 1 and 100% of the separated used magnetic activated carbon (4), removing the liquid (2), providing new liquid (2) to the container (3), providing the used magnetic activated carbon (4) to the container (3), adding between 1 and 100% of unused magnetic activated carbon (4), repeating the mixing and separation steps at least one time. The process allows for control of several parameters, such as the flow rate of the liquid, dosage of MAC and ratio used/
(Continued)

unused MAC required to remove micropollutants from the liquid.

11 Claims, 7 Drawing Sheets

(51) Int. Cl.
    *B01J 20/20*     (2006.01)
    *B01J 20/28*     (2006.01)
    *C02F 1/00*     (2023.01)
    *C02F 1/28*     (2023.01)
    *C02F 1/48*     (2023.01)
    *C22B 3/24*     (2006.01)
    *C02F 101/36*     (2006.01)
    *C02F 103/34*     (2006.01)

(52) U.S. Cl.
    CPC ......... *B01J 20/28009* (2013.01); *C02F 1/008* (2013.01); *C02F 1/283* (2013.01); *C02F 1/487* (2013.01); *C02F 1/488* (2013.01); *C22B 3/24* (2013.01); *B03C 2201/18* (2013.01); *C02F 2101/36* (2013.01); *C02F 2101/40* (2013.01); *C02F 2103/343* (2013.01)

(58) Field of Classification Search
    CPC .......... C02F 1/283; C02F 1/487; C02F 1/488; C02F 2101/36; C02F 2101/40; C02F 2103/343; C22B 3/24
    See application file for complete search history.

(56) References Cited

U.S. PATENT DOCUMENTS 7,879,136 B2 *    2/2011    Mazyck ................... B01J 20/20
                                                                      502/421
2005/0155934 A1    7/2005    Vo

FOREIGN PATENT DOCUMENTS

WO          2004064078 A3     10/2004
WO    WO-2014027953 A1 *   2/2014          B01D 15/08
WO          2018162611 A1     9/2018

OTHER PUBLICATIONS

Cennamo N. et al., Sensors (Basel). Jun. 5, 2018;18(6). pii: E1836. doi: 10.3390/s18061836.

Huang J. et al., Journal of Applied Electrochemistry, vol. 41, nr 1323 (2011).

* cited by examiner

PROCESS FOR REMOVING MICROPOLLUTANTS IN LIQUID OR GAS

TECHNICAL FIELD

The present disclosure relates to a process, a system and a use for removing micropollutants from liquid and gas. The process comprises providing untreated liquid or gas to a container, providing magnetic activated carbon and mixing it in said container, separating the magnetic activated carbon using a magnetic separator and removing and reusing the magnetic activated carbon.

BACKGROUND

There is always a need for improving the purification process of liquids or wastewater, such as liquids from soil, industrial mining or landfill. Especially with regard to removal of micropollutants, such as PFAS, metals, pharmaceutical residues from liquids or wastewater.

The contamination of water sources has become a tremendous preoccupation in western countries, including contamination from pharmaceuticals, polycyclic aromatic hydrocarbon (PAH), poly- and perfluoronated substances (PFASs) and heavy metals ions, due to their effects and damages on wildlife and human health.

Because of their high solubility and bio-accumulative properties, the removal of PFASs remains technologically challenging and this concern has raised particular attention within the last decade.

The long chain PFASs have been given a raising attention from the first detection of contamination in human blood serum on industrial production sites in the 70's. The PFAS are classified in three categories, distinguishing the polymeric compounds, and perfluoroalkyl and polyfluoroalkyl surfactants. Lately, perfluoroctane sulfonic acids (PFOS) and its derivative have been added to the list of the persistent organic pollutant (POP) due to their particular properties of being resistant to natural biodegradation, their bio-accumulativity, their long range transportation ability and proven toxicity for wildlife and human health.

PFASs have demonstrated a strong immunotoxicity, as well as reproductive and developmental effects, and some derivative have been classified as possible carcinogen by the international agency for research on cancer. The damages of long chain PFASs (>C8) on human health have forced the industrial and authorities to act in order to bail out their use and production within western countries. However, pollution from the rest of the world continues to affect us. Much less attention has been given to short chain derivatives and telomeres that are now used as substitutive chemical, although recent studies suggest an equivalent toxicity, which foresees a rapid change in the legislation regarding these compounds.

Up to date, 11 compounds are concerned by the PFAS regulation from the Swedish national food agency, who sets the health advisory concentration limit at 90 ng/l in drinking water. The concerned compounds are: PFBS, PFHxS, PFOS, 6:2 FTSA, PFBA, PFPeA, PFHxA, PFHpA, PFOA, PFNA, and PFDA. Above this concentration, actions must be taken in order to reduce the amount of contamination. On the other side, the Swedish Geotechnical Institute (SGI) suggested to not excess a concentration of 45 ng/l PFASs for groundwater, due to their high bio-accumulative properties.

From the first detection of PFAS contamination close to Goteborg airport in 2005, systematic national analysis of water sources has been carried out revealing a large spreading of contamination in Sweden. More than 40 groundwater sources were identified with above threshold PFOS rates linked with field contamination. A recent report from the Nordic Council estimates the annual health related cost from PFAS contamination to 2.8 to 4.6 billion euros. Faced with this situation, the Swedish government has urged for an immediate action plan to restrain and retreat the sources of PFAS contamination.

Actual technologies for the remediation of contaminated soil consist in fixation of the PFAS in the ground or digging and soil washing process. The fixation techniques has the advantage of avoiding immediate leakage of PFAS and drainage of the contaminant or micropollutants to a water resource, although it appears to be a short term solution as the contaminants are still present in the soil, and this soil remains impossible to use for human activities. The soil washing technique requires a consumption of large amounts of water, and subsequent filtration of the contaminated water. Actual technologies for water purification involve multistep processes including coagulation/flocculation/sedimentation, ozonation, chlorination, aerobic biodegradation, UV irradiation, nanofiltration and reverse osmosis. Some of these techniques are expansive either totally ineffective or poorly effective for removal of PFAS and short chain derivatives.

A foam-fractionation technique has been given recent interest in Australia but request voluminous installations. While anion exchanges resins exhibiting a high up-takes for anionic PFAS, this technique and remains limited to charged surfactants (excluding uncharged surfactants and telomeres). Besides, the techniques mentioned above experience interference with competing substances, i.e. other micropollutants present in the liquid, which are different from the micropollutants that are intended to be removed by the technique. These competing substances need to be removed prior to removing the micropollutant that is intended to be removed. Such pre-cleaning steps are costly and time consuming.

Widely used is the filtration process with granular activated carbon (GAC), a material obtained from the pyrolysis of bituminous forming millimeter sized coal particles. The GAC filtration techniques have been favoured as it is easy to operate at relatively low cost, but it requires voluminous installations. Belkouteb et al, Water Research, 182 (2020) 115913, p 1-10 illustrates the use of GAC for removal of PFAS from wastewater together with problems related to GAC. A significant problem with GAC is that all the carbon is exposed to the water stream in a linear process. In real applications of the wastewater, large contact tanks need to be provided. In Uppsala, Sweden, GAC is used for cleaning wastewater in 10 tanks, each having a volume of 23 m$^3$, whereby the tanks are connected in parallel as illustrated in FIG. 1 in the articles. The contact time is 23 minutes. Small sized "pregnant" carbon microparticles are released during the process, thereby bringing contaminants into the outgoing water stream.

The contact tanks are regularly back-flushed to remove large particles and algae. GAC becomes saturated and break-through of PFAS substances occurs as illustrated in attached FIG. 5 of the article. A reason for this is saturation of the surface and short chain PFAS is replaced by long chain PFAS. It is clear from FIG. 5 that short chain contaminants, e.g. <C8 PFAS, leak from the systems starting from a couple of thousand bed-volumes treated water. within a couple few months. The up-take of long-chain chain PFAS molecules gets lower after about 20 000 bed volumes that corresponds to a year in operation. To mitigate rapid decline of the GAC performance the flow rate of the liquid can be reduced but the penalty is that larger tank volumes will be needed.

Another problem with GAC is that the pores of the carbon get easily filled with other pollutants also present in wastewater, such as drugs and metals and other competing substances that are often present in liquids, such as toluene, and the like. The costs for removal of PFAS in Uppsala drinking water up to a level below 85 ng/litre is about 170 000 Euro per tank×10 tanks is 1 700 000 Euro per year as is shown in the attached table 2 of the Belkouteb article.

Lowering the threshold for release of PFAS will dramatically increase to cost due to more frequent replacement of carbon inventory.

A study in Borlänge, Sweden showed that for removal of drugs from wastewater, the amount of GAC inventory in contact tank is estimated at 140 000 kg. Similar figure for MAC inventory in contact tank is 65 kilos.

Alternatively, powder activated carbon (PAC) has shown to have a much faster and larger uptake capacity for adsorption of PFAS, reducing the time for equilibrium for adsorption from 50-160 hours for GAC (depending on the water pH), to 3-5 hours for MAC. Due to a higher pore volume and higher active surface area resulting from a reduced particle size, the amount of adsorbed PFAS is at least twice higher than for GAC particles: appr. 500 mg/g for pulverized carbon PAC and appr. 160 mg/g for granulated carbon GAC. PAC is mixed into the water stream and needs to be separated by means of microfilters or sandfilters. Microfilters are easily blocked and causes pressure drop energy loses. PAC in sandfilters is difficult to separate from the medium.

For both processes using GAC and PAC large immobile installations are needed, where wastewater must be transported to the installation and GAC or PAC must be transported from the installations after use to be burned. Although mobile tanks filled with GAC can be rented, the carbon dioxide footprint of these installation is not environmentally friendly.

The scientific society has made great efforts to identify possible novel approaches for water treatment and/or detection of PFASs in the environment. The conventional proposed analytical methods are based on chromatographic techniques coupled with mass spectrometry. All these methods are time-consuming, expensive and they often require a complicated pre-treatment step. A few research groups and industrial companies have worked to find a rapid, simple and sensitive method for the detection of PFAS substances.

Electrochemical sensors have been developed to measure the concentration of PFAS in water, including surface water and ground water. Recently, a few research groups in Italy, Cennamo N. et al., Sensors (Basel). 2018 Jun. 5; 18(6). pii: E1836. doi: 10.3390/s18061836, have developed an electrochemical biosensor for sensitive detection of PFOS in seawater. Biosensors, based on a novel surface plasmon resonance (SPR) optical fiber modified gold surface, make it possible to sense PFOA/PFOS at a concentration less than 0.21 ppb. Another electrochemical sensor for sensitive and selective detection of trace levels of PFOS in water is based on a gold electrode modified with a thin coating of a molecularly imprinted polymer (MIP) prepared by anodic electro-polymerization of o-phenylenediamine, o-PD, in the presence of PFOS as the template. The sensor has a low detection limit of 0.04 nM for PFOS.

Huang J. et al., Journal of Applied Electrochemistry, vol 41, nr 1323 (2011), discloses a novel sensor based on amperometric detection by using molecularly imprinted polymers (MIPs) and gold nanoparticles to detect bisphenol A (BPA).

As a further example, an Australian industrial company called CRC CARE has developed a clay-mineral mix, matCARE™, that cleans up the hazardous per- and polyfluorinated alkyl substances (PFASs) from soil and water using an immobilization technique. They have also developed anionic surfactant detection, AstkCARE™, as a sensor to measure the concentration of PFASs connected with a smart mobile App. The AstkCARE™ sensor is an improved version of methylene blue active substrates, molecularpolymer-based ion-selective electrode (ISE) and surface-enhanced Raman scattering. It selectively detects PFOA/PFOS down to 0.5 parts per billion (ppb).

Magnetic activated carbon (MAC) is a porous carbon material class that has high surface area and strong magnetic properties. MAC allows for use as a new alternative of powderized activated carbon materials in different applications due to their small particles size, high surface area and highly magnetic properties, which makes it easy to separate it from the solution using, for example, an external magnetic bar.

High performance porous MAC derived from biomass feedstock has been successfully manufactured using pyrolysis activation processes. MAC has a large surface area and strong magnetism properties because its richness in $Fe_3O_4$ particles.

MAC is characterized by high quality, sustainable and an environmentally friendly material, which can be used as a promising adsorbent in liquids or wastewater, such as industrial water, drinking water, mining liquids or water, sewage and soil washing water or gas. MAC can be used in advanced treatments to remove micropollutants and to extract precious metal in mining industry, such as gold. In water treatment, MAC can be used to remove, for example, pharmaceutical residues, PFAS substances, dyes and heavy metal pollutants. MAC can also be used to extract precious metals, such as gold, silver, or phosphorus. MAC can also be used to purify air or gases, such as methane, carbon dioxide, hydrogen, etc. MAC has been shown to be efficiently used in removal and recovery of As(V), PFAS, Cu(II), Cr(II), Cr(VI), Cd(II), Cs, Hg, Pb(II), Zn(II).

There is a need for a simple and less expensive process for the removal of pollutants, especially micropollutants from liquids or wastewaters or gases. There is a need for a process that effectively and efficiently removes micropollutants from liquids or wastewaters. The is a need for a process with smaller carbon inventory and consumption than GAC and more efficient separation than PAC.

SUMMARY

It is an aim of the present disclosure to provide an improved process for removing micropollutants in liquids or wastewater or gases.

This aim is achieved by a process as defined in claim 1.

The disclosure provides a process for removing micropollutants from liquid or gas. The process comprises or consists of:
  a) providing untreated liquid or gas to a container adapted to hold a liquid or a gas,
  b) providing magnetic activated carbon to the container,
  c) mixing the liquid or gas and the magnetic activated carbon in the container,
  e) separating the magnetic activated carbon from the liquid or gas using a magnetic separator, f) removing between 1 and 100% of the separated used magnetic activated carbon, g) removing treated liquid or gas, h) providing new untreated liquid or gas to the container, i) providing the used magnetic activated carbon to the container without the removed between 1 and 100%, j) adding between 1 and 100% of unused magnetic activated carbon to the container, thereby adding the amount of carbon removed in step f, k) repeating steps a to j, or c to f at least one time.

This process provides liquid or gas cleaned/treated from micropollutants. Furthermore, the amount of used magnetic activated carbon can be reduced by reusing most of it several times. The circular process of the invention provides an improved process for effective and efficient removal of micropollutants from liquids and wastewaters or gas in a cost-effective manner. The process of the invention is circular for use of the absorbent (MAC) in contrast to the linear processes in the prior art, such as use of GAC and PAC as absorbents. While the liquid or gas flows through the system at a constant rate, MAC is being re-circulated and re-used. Used MAC can even be regenerated and re-used. This reduces costs and improves the environmentally friendliness of the process.

In contrast to the linear process using GAC and PAC, more than one parameter can be used to optimize the removal of micropollutants. In the process of the invention, the contact time (flow rate), the dosing of MAC and the ratio of used/unused MAC can be regulated. This regulation allows for quick adaptability of the process for removal of different concentrations or types of micropollutants. The efficiency of the process can continuously be adapted during the process. The allows for a considerable improvement of removal efficiency compared to the known processes.

The process can be performed at a large scale in a relatively simple manner, because the process does not require large inventory carbon, or filter installations. Even short chain carbons and telomeres are removed in the process of the invention. Due to the magnetic properties of the MAC, the risk for none-removal of small particles of MAC is minimized. The time needed for water to reside in contact tank is in the interwall of 5 to 6 hours depending on up-take levels wanted. MAC process eliminates the need for back-flush as for GAC. The total amount of carbon (MAC) needed for good up-take may be in the interval of 80-300 grams per m$^3$ water. The contact tank thus comprises to more than 99% of water. The study in Borlänge, Sweden showed that the amount of MAC needed using the process of the invention is about 0.05% of the amount of GAC needed in a process for removal of drugs from the liquid, 140 ton of GAC compared with 65 kilo of MAC. Therefore, the volume needed for tanks is reduced and so are the overall costs.

The "age" or condition of MAC can be followed in real time and continuously adapted by changing the ratio of used/unused MAC. This improves the effectivity and efficiency of the process. The process of the invention is especially suitable for small molecular micropollutants or short chain PFAS. As shown in the attached FIG. 5 of Belkouteb et al, these small molecular micropollutants leak from the linear GAC process. By reusing MAC in the circular process of the invention, both small molecular micropollutants and larger micropollutants can be effectively removed from the liquid, such that leakage of such micropollutants can be prevented.

The process can be performed in an automatic manner, preferably by using a controller over the internet. This reduces costs for manpower.

In an aspect, the process is performed continuously. The invention relates to a continuous process, whereby the liquid or gas flows at a predetermined and adaptable flow rate through a container, while magnetic activated carbon is constantly added to the container, mixed with the liquid or gas and subsequently separated and removed from the liquid or gas using a magnetic separator, and then again added to the liquid or gas at a predetermined and adaptable dosage of MAC and at a predetermined and adaptable ratio of used/unused MAC, whereby MAC is re-circulated outside the container using a recirculation arrangement comprising another container for mixing the used magnetic activated carbon with unused magnetic activated carbon and a dosage arrangement for dosing the mixed used magnetic activated carbon and unused magnetic activated carbon to the container through which the liquid or gas flows. Several processes may be arranged in series.

In another aspect, the process is performed batch-wise. A mechanically mixer may be used for the mixing in step b).

According to some aspects, the magnetic separator is arranged in a separate container and process comprises or consist of an additional step:

d) transferring the liquid mixed with the magnetic activated carbon to the magnetic separator via pipes.

The separate container may thus be specifically designed to separate the used magnetic activated carbon from the treated liquid. This may improve the speed of the cleaning process. Especially, in large scale processes or in automated processes, it may be advantageous to use a magnetic separator.

According to some aspects, the amount of magnetic activated carbon provided to the container in step b is between 80 and 120 mg or 100 to 300 mg per litre of liquid. Such amounts are especially effective in removing micropollutants in liquids such as wastewaters, for example for removal of short and long chain PFAS molecules. As explained above, the total amount of carbon needed in the process of the invention is reduced by a factor thousand or more. The the dosage of magnetic activated carbon provided to the container in step b depends on the type of pollutant, type of liquid or gas, the concentration of pollutant in the liquid or gas and the acceptance level of the micropollutants in the cleaned liquid. Dosing is one of the parameters of the process that can be constantly regulated and adapted during performing of the process. The dosing of MAC is related to the other main parameters of the process, namely flow rate of the liquid or gas and ratio used/unused MAC.

According to some aspects, the mixing of the liquid and the magnetic activated carbon is done for at least 25 minutes. After 25 to 30 minutes most micropollutants in liquid have been adsorbed to the magnetic activated carbon particles. The contact time depends on the type of pollutant, type of liquid or gas, the concentration of pollutant in the liquid and the acceptance level of the micropollutants in the cleaned liquid. The flow rate of the liquid or gas and contact tank volume determine the contact time of the carbon with the micropollutants in the liquid or gas. As mentioned above, the dosage of MAC, ratio used/fresh MAC and contact time are regulated in real time for up-take of micro-pollutants to reach the wanted limit of contaminants in out-going water stream.

According to some aspects, the step b) providing magnetic activated carbon to the container, comprises or consists of:

b1) receiving, in a processing circuitry, data input from one or more contamination sensor, the data input being representative of the amount of micropollutants in the liquid or gas in the container, b2) determining, in the processing circuitry, the flow rate of the liquid or gas, dosage of MAC and ratio used/unused MAC required to remove the amount of micropollutants in the liquid or gas in the container, b3) providing the determined amount of magnetic activated carbon to the container and determine the flow rate and ratio used/unused MAC.

According to some aspects, the step b) providing magnetic activated carbon to the container, comprises or consists of:

b1) receiving, in a processing circuitry, data input from one or more contamination sensor, the data input being representative of the amount of micropollutants in the liquid in the container, b2) determining, in the processing circuitry, the amount of MAC required to remove the amount of micropollutants in the liquid in the container, b3) providing the determined amount of magnetic activated carbon to the container.

In other words, one or more sensors may be used to determine the amount of micropollutants in the liquid which, in turn, is used to determine the amount of MAC to be used to clean the liquid of the micropollutants as well as flow rate and ratio used/unused MAC. In this way, the amount of MAC, the flow rate and ratio used/unused MAC used can be optimized so that there is enough MAC to adsorb the micropollutants but not an excessive amount. This saves cost and time for performing the removal of micropollutants/contaminations from waste waters. This improves efficiency of the process and reduces overall costs.

According to some aspects, the magnetic separator separates the magnetic activated carbon using an electromagnetic field. An electromagnetic field is easy to produce. In one aspect, electromagnets or permanent magnets are used for separation of the magnetic activated carbon. Magnetic separators for continuous separation of magnetic activated carbon operation are available in the market.

According to some aspects, the removing between 1 and 100% of the separated used magnetic activated carbon and adding between 1 and 100% unused magnetic activated carbon to the container comprises removing between 1 and 10% of the separated used magnetic activated carbon and adding between 1 and 10% unused magnetic activated carbon to the container. According to some aspects, the removing between 1 and 100% of the separated used magnetic activated carbon and adding between 1 and 100% unused magnetic activated carbon to the container comprises removing between 1 and 5% of the separated used magnetic activated carbon and adding between 1 and 5% unused magnetic activated carbon to the container. According to some aspects, the adding of between 1 and 100% unused magnetic activated carbon to the container comprises adding the same amount of unused magnetic activated carbon that has been removed from the separated used magnetic activated carbon. The ratio used/unused MAC may for example be 0.001:1 to 1:0.001, or 0.05:0.95 to 0.95:0.05, or 1:9 to 9:1.

The amount of changed magnetic activated carbon should be high enough to help keep the removal of micropollutants effective and low enough to reuse most of the magnetic activated carbon once or several times. The ratio used/unused MAC depends on the type of pollutant, type of liquid or gas, the concentration of pollutant in the liquid and the acceptance level of the micropollutants in the cleaned liquid. As mentioned above, said ratio is related to the flow rate and dosage of MAC. The removal of part of the MAC improves effectivity and efficiency of the process.

FIG. 6 shows a graph of surface saturation of carbon versus time. By replacing 100% of MAC, the carbon will never become totally saturated. This may be useful when separating gold from a liquid to maximize removal of gold from the liquid. As shown in FIG. 6, when MAC is not replaced, the carbon surface is saturated quickly, whereafter leakage of micropollutants may occur. This is what happens in the GAC tanks. For most applications, the amount of MAC to be removed and added will be between these 100% intervals and depends on the type of pollutant, type of liquid or gas, the concentration of pollutant in the liquid and the acceptance level of the micropollutants in the cleaned liquid as well as ratio used/unused MAC and flow rate. Because the dosage of MAC can be varied easily in the process of the invention, the flexibility of the process has been improved compared to the linear known processes.

When the process is performed continuously, a small portion of used magnetic activated carbon is discharged and a same amount unused magnetic activated carbon is added resulting in the same amount of carbon continuously recycling in the process. The total amount of magnetic activated carbon used in the process is thus kept constant during repeated cycles of removing micropollutants from liquid. As illustrated in FIG. 7, the average "age" of MAC used in the process of the invention is constant over time, while GAC "age" is linear increasing as function of number bed-volumes water treated.

According to some aspects, the repeating steps a to j, or steps c to f, at least one time, comprises repeating steps a to j, or c to f at least 5 times. The more times the magnetic activated carbon can be re-used, the lower the costs for performing the process. In a continuous process, the repeating of the steps does not include repeating cleaning of the same liquid. Only the MAC or part of the MAC is being recirculated. The liquid flows through the system during the process.

Another advantage of the process of the invention is that it allows for full automation of the process, which reduces cost and improves efficiency and effectivity of the process. The process with sensors further facilitates performing the process in an automatic manner, preferably by using a controller over the internet. This reduces costs for manpower.

According to some aspects, the step of removing the liquid comprises transferring the liquid to a second container for separated treated liquid cleaned from micropollutants. The liquid may be a valuable liquid that needs to be preserved such as drinking water or industrial valuable liquids.

According to some aspects, the step of removing the liquid comprises transferring the liquid to a third container for performing the process again as defined anywhere above. That may be needed when the liquid is heavily contaminated with micropollutants and competing substances.

The process may thus comprise the step of;

a-1) providing untreated liquid or gas 2-1 to a container 3-1 adapted to hold a liquid or gas, at a predetermined flow rate, for example 5 to 25 $m^3/h$, or 5 to 15 $m^3/h$, b-1) providing magnetic activated carbon 4-1 to the container 3-1, at a predetermined dosage, for example 50 to 400 mg/l, or 50 to 350 mg/l and at a predetermined ratio of used/unused MAC 4-1, c-1) mixing the liquid or gas 2-1 and the magnetic activated carbon 4-1 in the container 3-1, e-1) separating the magnetic activated carbon 4-1 from the liquid or gas 2-1 using a magnetic separator 5-1, f-1) removing between 1 and 100%, or between 1 and 50%, between 1 and 10%, of the separated used magnetic activated carbon 4-1, g-1) removing the treated liquid or gas 2-1 to a third container 3-2, at a predetermined flow rate, for example 5 to 25 m³/h, or 5 to 15 m³/h, h-1) providing new untreated liquid or gas 2-1 to the container 3-1, at a predetermined flow rate, for example 5 to 25 m³/h, or 5 to 15 m³/h, i-1) providing the used magnetic activated carbon 4-1 to the container 3-1 without the removed between 1 and 100%, or between 1 and 50%, between 1 and 10%, j-1) adding between 1 and 100%, or between 1 and 50%, between 1 and 10%, of unused/fresh magnetic activated carbon 4-1 to the container 3-1 (which is the removed amount of magnetic activated carbon 4-1), k-1) repeating steps a to j, or c to f at least one time, and a-2) providing liquid or gas 2-2 to a container 3-2 adapted to hold a liquid or gas, at a predetermined flow rate, for example 5 to 25 m³/h, or 5 to 15 m³/h, b-2) providing magnetic activated carbon 4-2 to the container 3-2, at a predetermined dosage, for example 50 to 400 mg/l, or 50 to 350 mg/l and at a predetermined ratio of used/unused MAC 4-1, c-2) mixing the liquid or gas 2-2 and the magnetic activated carbon 4-2 in the container 3-2, e-2) separating the magnetic activated carbon 4-2 from the liquid or gas 2-2 using a magnetic separator 5-2, f-2) removing between 1 and 100%, or between 1 and 50%, between 1 and 10%, of the separated used magnetic activated carbon 4-2, g-2) removing the treated liquid or gas 2-2, at a predetermined flow rate, for example 5 to 25 m³/h, or 5 to 15 m³/h, h-2) providing new untreated liquid or gas 2-2 to the container 3-2, at a predetermined flow rate, for example 5 to 25 m³/h, or 5 to 15 m³/h, i-2) providing the used magnetic activated carbon 4-2 to the container 3-2 without the removed between 1 and 100%, or between 1 and 50%, between 1 and 10%, j-2) adding between 1 and 100%, or between 1 and 50%, between 1 and 10%, of unused/fresh magnetic activated carbon 4-2 to the container 3-2 (which is the removed amount of magnetic activated carbon 4-2), k-2) repeating steps a to j, or c to f at least one time.

According to some aspects, the micropollutants are selected from the group comprising or consisting of pharmaceutical residues, pesticides, insecticides, PFASs, such as perfluorooctanoic acid (PFOA), heptafluorobutyric acid (PFBA), nonafluorobutane-a-sulfonic acid (PFBS) perfluorooctanesulfonic acid and perfluorooctanesulfonate (PFOS), or polycyclic aromatic hydrocarbons (PAH), dye, air or gases, such as methane, carbon dioxide, hydrogen, mineral micropollutants, such as gold, arsenic, copper, chromium, lead, mercury, caesium and zinc, or radioactive isomers thereof, or mixtures of micropollutants. All these micropollutants are important to remove from liquid to obtain good quality liquid or water. Furthermore, the process can be used in the mining industry to extract precious metals, such as gold and silver particles from liquid, or other environmentally dangerous heavy metals, such as As(V), Cu(II), Cr(II), Cr(VI), Cd(II), Cs, Pb(II), Zn(II) from liquids or wastewaters. In an aspect, the micropollutant is PFAS. The PFAS may be selected from the group comprising or consisting of perfluorooctanoic acid (PFOA), heptafluorobutyric acid (PFBA), nonafluorobutane-a-sulfonic acid (PFBS) perfluorooctanesulfonic acid and perfluorooctanesulfonate (PFOS). The PFAS may be selected from the group comprising or consisting of PFBS, PFHxS, PFOS, 6:2 FTSA, PFBA, PFPeA, PFHxA, PFHpA, PFOA, PFNA, and PFDA. In one aspect, the micropollutants comprises or consists of pharmaceutical residues. In some aspects, the micropollutants comprises or consists of pesticides, insecticides. In some aspects, the micropollutants are radioactive micropollutants.

In another aspect, the micropollutant is goldcyanide $Au(CN)_2$. In the gold mining industry cyanide is used for leaching gold out of ore. In the gold industry GAC is used to retrieve the goldcyanide from the leachate liquid. A significant draw-back using GAC is loss of goldcyanide due to abrasion of "pregnant" carbon microparticles so called "fine tailings". The small carbon fine tailings pass through the filters and end up in the sediments. Loss of goldcyanide due to fine tailings can be in the range of 1-5% of total gold production at a goldmine.

According to some aspects, the process comprises or consists of an additional step:
l) processing the removed between 1 and 100% of the separated used magnetic activated carbon to remove the adsorbed micropollutants.

According to some aspects, the process comprises or consists of an additional step:
m) regenerating the used magnetic activated carbon to unused magnetic activated carbon, and
optionally m2) re-activating the regenerated magnetic activated carbon.

In some aspects, step m) comprises, washing MAC with an organic solvent, adapted to desorb the micropollutant, concentrating the micropollutant by removing the organic solvent, washing and re-use the MAC and the organic solvent, and discard the micropollutant. In other words, the MAC can be regenerated so that it can be re-used as unused MAC. Also, the organic solvent can be re-used. This saves costs for the overall process. The total amount of MAC needed for the process is less compared to the use of GAC or PAC and the amount that needs to be discarded or burned is substantially less. The carbon dioxide footprint of the process of the invention is therefore strongly reduced compared to known processes.

The disclosure provides a system for performing the process according to the above features. The system comprises a container for mixing liquid or gas with magnetic activated carbon, a magnetic separator for separating the used magnetic activated carbon from the liquid or gas, a re-circulation arrangement comprising a container for mixing the used magnetic activated carbon with unused magnetic activated carbon and a dosage arrangement for dosing the mixed used magnetic activated carbon and unused magnetic activated carbon to the container. This provides a system for performing the process of cleaning liquid or gas of micropollutants. The same as for the process described above, the amount of used magnetic activated carbon can be reduced by reusing most of it several times. The amount of magnetic activated carbon removed and added may be between 0 to 100%, or between 0.1 and 15%.

According to some aspects, the system comprises or consists of an additional step:
a third container for mixing liquid or gas removed from the container with magnetic activated carbon,
a second magnetic separator for separating the used magnetic activated carbon from the liquid or gas.

According to some aspects, the system comprises or consists of an additional step:

a re-circulation arrangement comprising a container for mixing the used magnetic activated carbon with unused magnetic activated carbon and a dosage arrangement for dosing the mixed used magnetic activated carbon and unused magnetic activated carbon to the container.

An advantage of performing two processes in series is that a first process may be used for removal of first micropollutants or dominant substances, e.g. long chain PFAS molecules and competing substances, such as toluene, benzene, PAH, PCB, and other organic compounds and the like that may be present in the liquid or wastewater. The second process may be used for final removal of most of the remaining micropollutants, e.g. short chain PFAS molecules. An additional advantage of the subsequent process is that the concentration of second micropollutants in the liquid has increased after performing the first process. This improves efficiency of the process. A third process may be used in series with the first two processes.

The processes may also be connected in parallel and/or serial. This allows for the removal of different micropollutants from the liquid or gas by a simple effective, efficient and cost-effective process. The total amount of carbon needed using two or more processes in series or parallel is still considerably less compared to the amount of carbon needed in processes that use GAC or PAC. Also, the carbon dioxide footprint is less. Besides, by using GAC no differentiation between types of micropollutants are possible. When using GAC the voluminous tanks must be replaced more often to remove small molecules, such as short chain PFASs. In the processes using GAC or PAC only the flow rate can be regulated. In the process of the invention, several parameters of the process, such as flow rate, dosing, and ratio used/unused MAC, can continuously be regulated in each process independent of other processes in the series or parallel containers. This improves flexibility and removal efficiency of the process.

According to some aspects, the system comprises one or more first contamination sensor arranged in the container for measuring the amount of micropollutants in the liquid in the container. According to some aspects, the system also comprises processing circuitry arranged to receive data input from the one or more first contamination sensor, the data input being representative of the amount of micropollutants in the liquid or gas in the container and to control the dosage arrangement, the flow rate and the ratio used/unused MAC based on the data input. The one or more contamination sensor and the processing circuitry are thus used to make sure that the amount and ratio of mixed used magnetic activated carbon and unused magnetic activated carbon to the container is optimal for removing the micropollutants in the liquid or gas. The one or more contamination sensor and the processing circuitry allow the three parameters; flow rate, dosing, and ratio used/unused MAC to be continuously adapted to the level of contamination of micropollutants in the liquid or gas. This optimizes the removal efficiency of the process.

According to some aspects, the system comprises one or more second contamination sensor arranged to measure the amount of micropollutants in the liquid or gas after it has been separated in the magnetic separator. The output liquid or gas, after removing the micropollutants with the magnetic activated carbon, is thus controlled with the one or more second contamination sensor. By controlling the output liquid or gas, it is possible to adjust the calculations of the processing circuitry when needed. For example, if there are still micropollutants in the output liquid or gas, the flow rate, dosage of MAC and ratio of mixed used magnetic activated carbon and unused magnetic activated carbon can be changed. This increased flexibility for performing the process and improves effectivity and efficiency of the process.

The one or more first and/or second contamination sensor may alternatively be more than one sensor for detecting the amount of more than one micropollutant. The more than one first and/or second contamination sensor may alternatively be sensors for detecting the amount of different micropollutants.

The system can be handled in an automatic manner, preferably by using a controller over the internet. This reduces costs for manpower. The "age" or condition of MAC can be followed in real time and continuously adapted. This improves costs and effectivity and efficiency of the process.

According to some aspects, the one or more first and/or second contamination sensor comprises a one or more sensor for detecting the amount of one or more micropollutants selected from pharmaceutical residues, dyes, air or gases, such as methane, carbon dioxide, hydrogen, As(V), PFAS, Cu(II), Cr(II), Cr(VI), Cd(II), Cs, Hg, Pb(II), Au, Ag, Zn(II) or mixtures thereof.

According to some aspects, the one or more first and/or second contamination sensor comprises a one or more sensor for detecting the amount of per- and polyfluoronated substances (PFASs) in the liquid. The amount of perfluorooctanoic acid (PFOA), heptafluorobutyric acid (PFBA), nonafluorobutane-a-sulfonic acid (PFBS) perfluorooctanesulfonic acid and perfluorooctanesulfonate (PFOS) and other PFASs or polycyclic aromatic hydrocarbons (PAH), in the liquid or gas can thus be determined using sensors.

According to some aspects, the system is a transportable system adapted to be quickly installed at the site of the liquid to be treated. Technical building blocks, like pumps, valves, magnetic separators, dosage, control units can be built in a container that is pre-installed in a factory. Transportability of the system makes installation fast and reduces costs.

The disclosure provides a use of the system according to above, for removing micropollutants, wherein the micropollutants are selected from the group comprising or consisting of pharmaceutical residues, PAH, PFAS, gold, silver, dye, air or gases, such as methane, carbon dioxide, hydrogen, arsenic, copper, chromium, lead and zinc, or mixtures thereof.

The MAC used in the process and system may be manufactured in any matter. Examples of preparation methods may be using biomass, such as lignin, grass cutting, biosludge, beer waste and horse manure, in an HTC followed by activating using air or gases, such as methane, carbon dioxide, hydrogen. The HTC process may be performed under acidic conditions.

Alternatively, the MAC may be synthesized by a pyrolysis process of lignin, followed by a KOH activation with $N_2$ and a subsequent steam treatment at 580° C. for about 10 minutes.

GAC and PAC are mainly obtained from coal mines as bituminous coal. MAC on the other hand can be made from renewable energy sources such as waste from paper industry, lignin, and other plant materials.

According to some aspects, the magnetic activated carbon comprises the following properties and/or combination of properties:
 a surface area (SBFT) between 150 and 3000 $m^2/g$, or 250 and 1500 $m^2/g$, or 500 and 1000 $m^2/g$, or 1500 and 2500 $m^2/g$
 a total pore volume between 0.050 and 2.0 $cm^3/g$, or 0.250 and 1.5 $cm^3/g$, or 0.50 and 1.5 $cm^3/g$,
 a micropore volume between 0.005 and 1.5 $cm^3/g$, or 0.050 and 1.2 $cm^3/g$, or 0.50 and 1.0 $cm^3/g$, an iron content between 1 and 20 wt %, or 2 and 10 wt. % of the total weight of the magnetic activated carbon 4, and/or a saturated magnetic value between 5 and 20 emu/g, or 8 to 15 emu/g, or 10 and 12.5 emu/g.

The properties can be varied depending on the properties of one or more micropollutants, such as molecular size, hydrophobicity, charges, etc.

BRIEF DESCRIPTION OF THE DRAWINGS

The disclosure will now be explained more closely by the description of different aspects and with reference to the appended figures.

DETAILED DESCRIPTION

Figure 1:
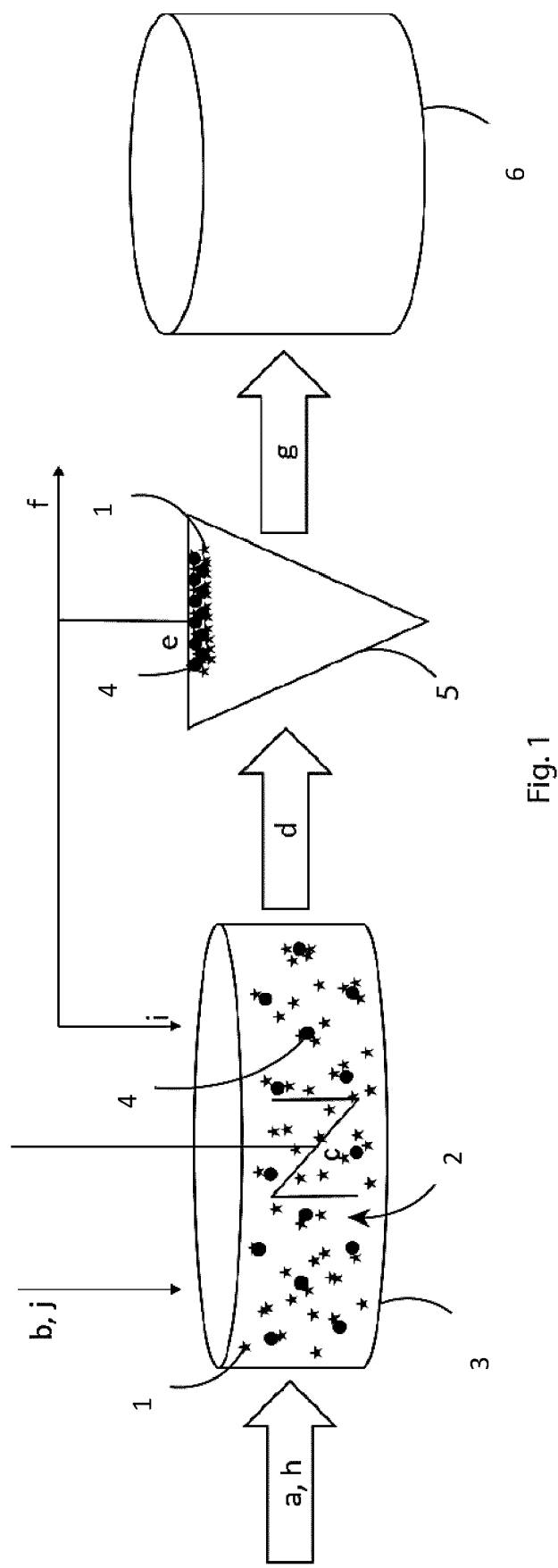
FIG. 1 shows a flow chart of an example system for the process of removing micropollutants.

Aspects of the present disclosure will be described more fully hereinafter with reference to the accompanying drawing. The process disclosed herein can, however, be realized in many different forms and should not be construed as being limited to the aspects set forth herein. Like numbers in the drawings refer to like elements throughout.

The terminology used herein is for the purpose of describing aspects of the disclosure only and is not intended to limit the disclosure. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs.

The term "wastewater" includes all kinds of wastewater, including industrial water, mining water, sewage water, drinking water and soil washing water. The concentration of water may be between 0.5 and 99.999 wt %.

The term "liquid" includes the term wastewater and other liquids that are not water from which micropollutants need to be removed.

The term "micropollutant" used herein means one or more pollutant or contamination in a liquid or gas at a molecular level. The term micropollutant includes mineral micropollutants, such as metals and heavy metals, and radioactive isotopes of any micropollutant.

The term "competing substances" used herein means other micropollutants present in the liquid or gas, which are different from the micropollutants that are intended to be removed by the cleaning process.

The term "percentage" or "%" are weight percentage of the total weight of MAC.

The term "unused magnetic activated carbon" may include regenerated and/or re-activated and/upgraded magnetic activated carbon.

The term "PFAS" includes fluorinated carbon compounds, which may be poly- and perfluoronated compounds, such as for example compounds selected from the group comprising or consisting of PFBS, PFHxS, PFOS, 6:2 FTSA, PFBA, PFPeA, PFHxA, PFHpA, PFOA, PFNA, and PFDA, or any mixtures thereof.

The terms "compound", "substances" and "molecule" have the same meaning unless expressly stated otherwise.

Figure 2:
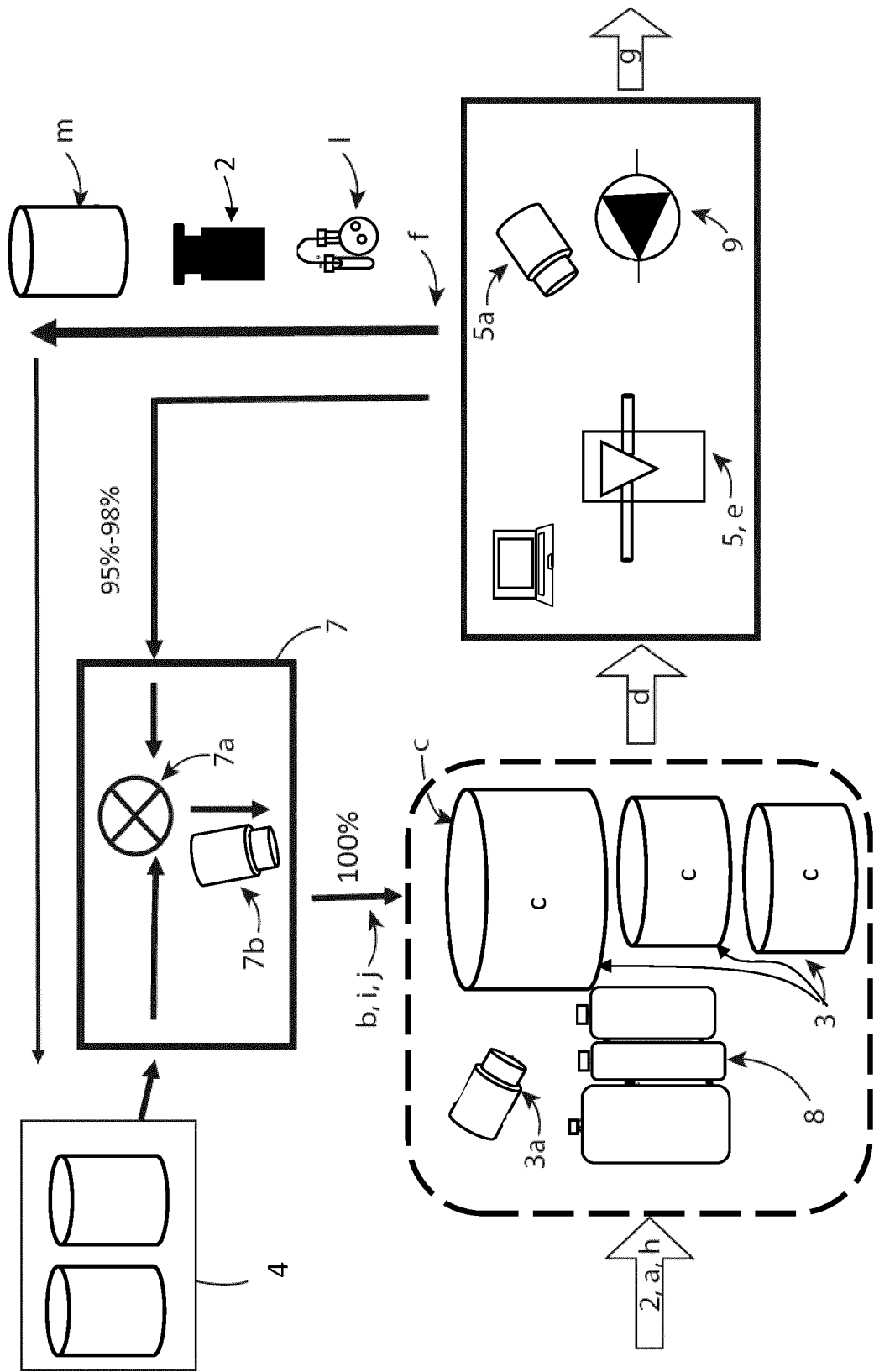
FIG. 2 shows a more detailed flow chart of an example system for the process of removing micropollutants.
Figure 3:
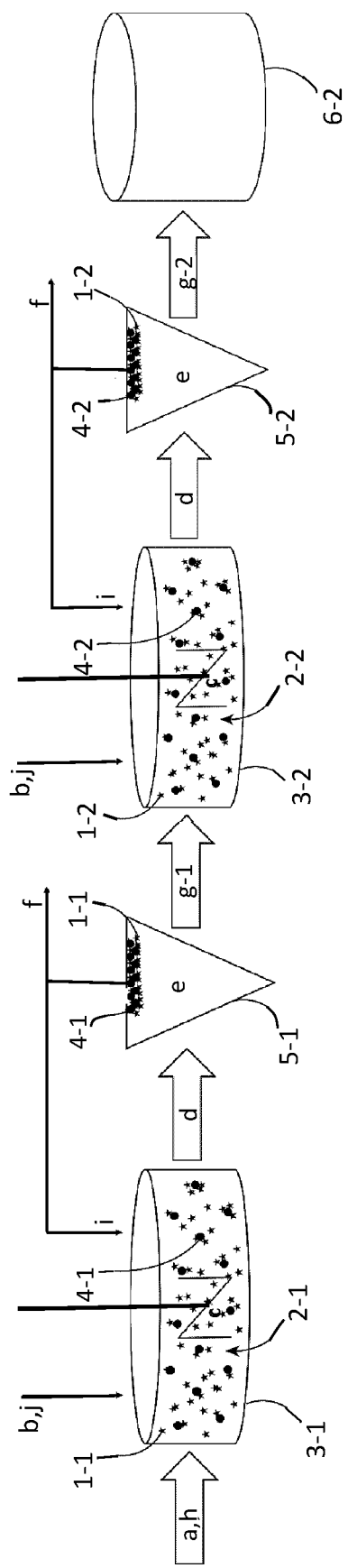
FIG. 3 shows a flow chart of second example system for the process of removing micropollutants.
Figure 4:
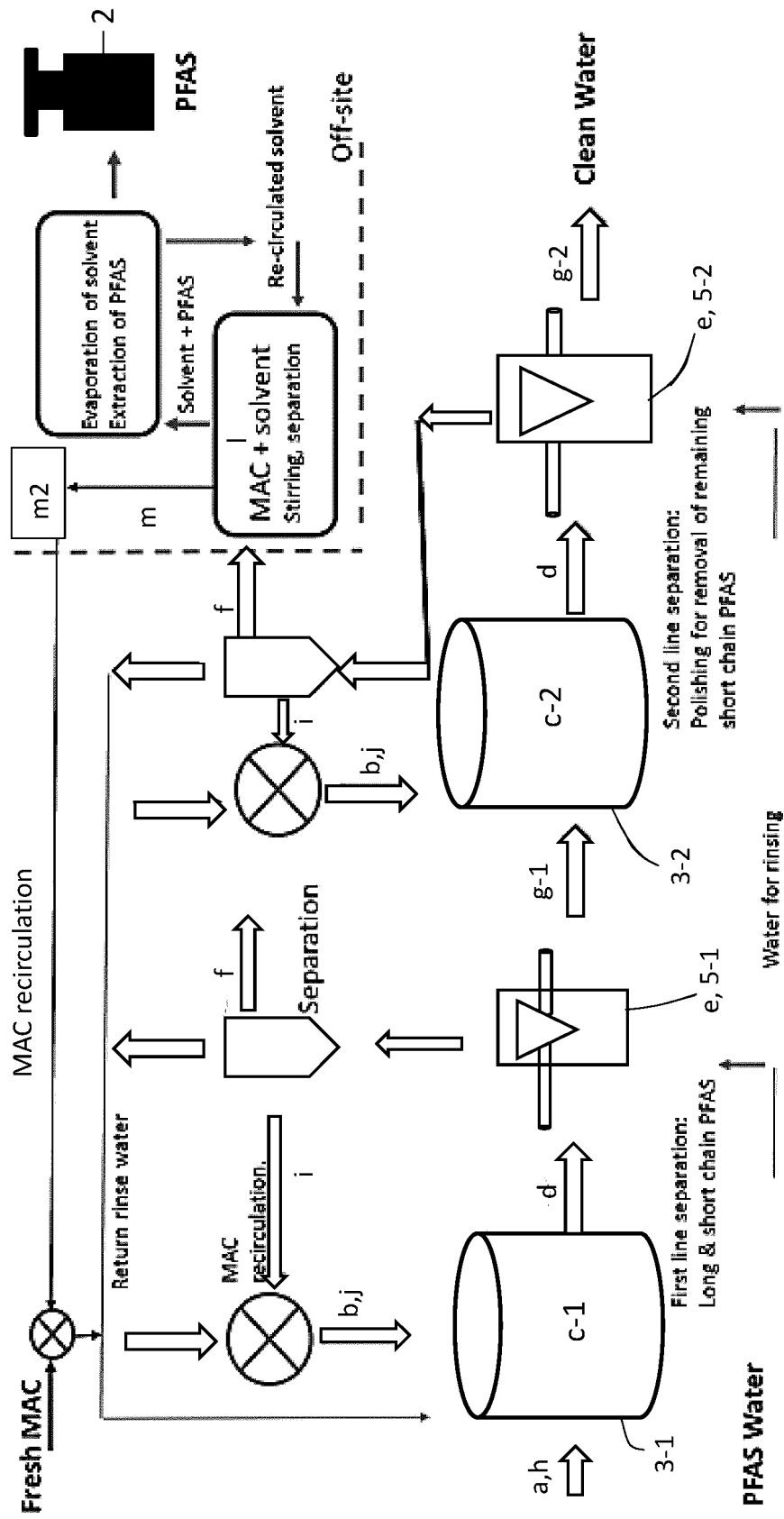
FIG. 4 shows a more detailed flow chart of the second example system for the process of removing micropollutants.
Figure 5:
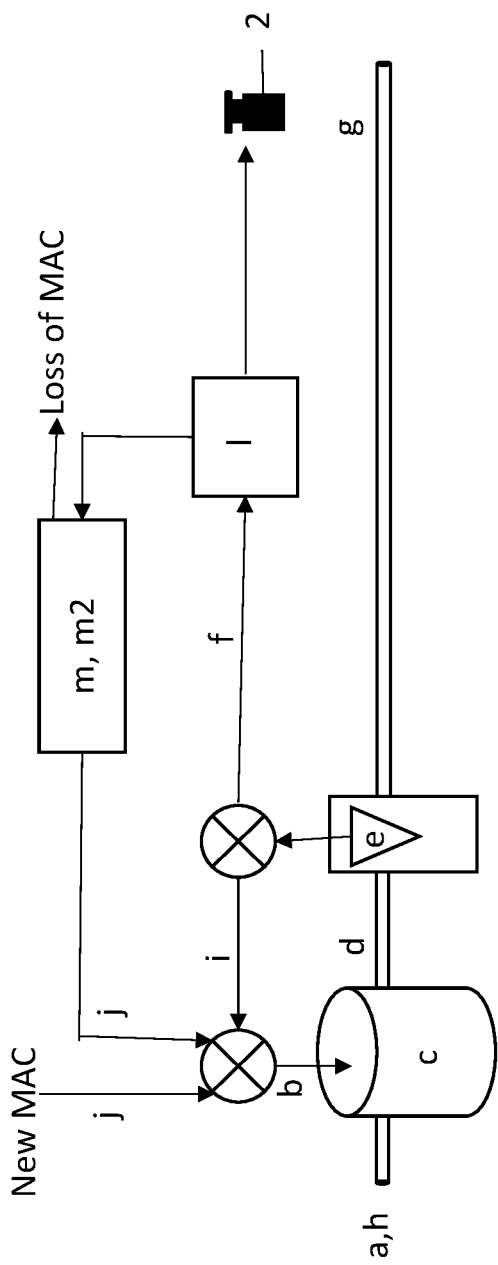
FIG. 5 shows a simplified process of the invention for circulation of MAC.

FIG. 1 shows a flow chart of an example system for the process of removing micropollutants 1. The system is for performing the process as described below. The system comprises a container 3 for mixing untreated liquid 2 with magnetic activated carbon 4 (MAC), a magnetic separator 5 for separating the used magnetic activated carbon 4 from the liquid 2. The process and system may be used in series or in parallel as illustrated in FIGS. 2 to 4. The series and parallel systems allow for removal of different micropollutants from liquids.

In FIG. 2 is shown that the system comprises a re-circulation arrangement 7 comprising a container 7a for mixing the used magnetic activated carbon (MAC) 4 with unused magnetic activated carbon 4 and a dosage arrangement 7b for dosing MAC and for mixing used magnetic activated carbon 4 and unused magnetic activated carbon 4 to the container 3. This provides a system for performing the process of cleaning liquid from micropollutants. With the system, the amount of used magnetic activated carbon can be reduced by reusing most of it several times. In the figure is also illustrated that a filter 8 can be used to filter the liquid before it is added to the container 3. The filter 8 may be a microfilter adapted for removal of sand, plant material and the like.

The disclosure provides a process for removing micropollutants 1 in liquid 2. The process comprises or consists of the following steps.

In step a) untreated liquid 2 is provided to a container 3. Pipes may be used for this purpose. The liquid may be provided at a constant flow rate or at a flow rate that is varied depending on the cleaning efficiency of the process.

In a step b) the magnetic activated carbon (MAC) 4 is added to the container 3. The liquid (or gas) is then mixed with MAC in step c) for a period of time that depends on the flow rate of the liquid.

After mixing, MAC 4 is separated from the liquid (or gas) in step e) using a magnetic separator 5. After removal of MAC from the liquid in step e), 1 to 100%, or 1 to 50% of MAC is removed from the process in step f). Subsequently, the liquid (or gas) 2 is removed from the container 3 in step g).

New liquid or gas is than added to the container 3 in step h).

In step i) MAC 4 that has been used earlier in the process minus the amount of MAC that was removed in step f) is added to the container. In addition, fresh/unused MAC is added to the container 3 in step j). This amount of fresh/unused MAC being the same as the amount of MAC that was removed in step f).

The process steps a to j, or at least steps c to f are constantly repeated, or at least once, or twice or five times.

This process provides liquid 2 cleaned or treated from micropollutants 1. Micropollutants 1 adhere to the magnetic activated carbon 4 in the mixing step and are removed with the magnetic activated carbon 4 in the separation step e. The MAC carbon particles do not become saturated after one process run. A lot of the magnetic activated carbon 4 can be reused since the magnetic activated carbon 4 particles have a large surface area and a large pore volume. There is a lot of room on and inside the particles to adhere micropollutants 1 to the magnetic activated carbon 4 particles. Thus, the amount of used magnetic activated carbon 4 can be reduced by reusing most of it several times.

The liquid 2 is for example provided to the container 3 via a pipe or the like. The container 3 may also be in the form of a pipe, where the liquid 2 is continuously flowing forward while being mixed with the magnetic activated carbon 4 until it reaches the magnetic separator 5. One or more pumps 9 may be used to move the liquid between containers and pipes.

In a continuous system, the liquid or gas flows through the system at a predetermined flow rate. The flow rate determines the contact time of MAC with the one or more micropollutants.

The flow rate depends on the type of pollutant, type of liquid, the concentration of pollutant in the liquid and the acceptance level of the micropollutants in the cleaned liquid. The flow rate may be between 5 $m^3$/hour and 25 $m^3$/hour.

The flow rate, the dosage of MAC and the ratio of used/unused MAC are the main parameters that can be adapted to optimize the removal efficiency of the process. In the processes using GAC or PAC, only the flow rate can be adapted.

The mixing is for example performed using any kind of mixing device, i.e. blending device. The example mixing device in FIG. 1 comprises an arm protruding into the container 3 with a head with a shape that mixes the liquid 2 and the magnetic activated carbon 4 when the arm is turned. The mixing may be done at a speed and period that assures an optimum contact time. The speed of mixing depends on the type of pollutant, type of liquid, the concentration of pollutant in the liquid and the acceptance level of the micropollutants in the cleaned liquid.

The process is for example carried out at room temperature. Room temperature is defined as a temperature between 18 and 25° C. The process may also be carried out outside of this range.

As can be seen in FIG. 1, the magnetic separator 5 may be arranged in a separate container. In such case, the process comprises:
d) transferring the liquid 2 mixed with the magnetic activated carbon 4 to the magnetic separator 5 via pipes.

The separate container 5 may thus be specifically designed to separate the used magnetic activated carbon 4 from the liquid 2.

Alternatively, the container 3 is arranged to perform the magnetic separation. In other words, the container 3 may both be used to mix the liquid 2 and the magnetic active carbon and as a magnetic separator 5.

The magnetic separator 5 may for example comprise means for creating an electromagnetic field for separating the magnetic active carbon. Thus, the magnetic separator 5 separates the magnetic activated carbon 4 using for example an electromagnetic field. An electromagnetic field is easy to produce at low cost.

The amount or dosage of magnetic activated carbon 4 used in the process depends among others on the type of pollutant, type of liquid, the concentration of pollutant in the liquid and the acceptance level of the micropollutants in the cleaned liquid as well as flow rate of the liquid or gas and the ratio of used/unused MAC. The amount of magnetic activated carbon 4 provided to the container 3 in step b is for example between 50 and 350 mg per litre, or between 50 and 300 mg per litre, or between 50 and 250 mg per litre of liquid 2. The amount of magnetic activated carbon 4 may be between 80 and 120 or between 90 and 110 mg per litre of liquid 2.

As can be seen in FIG. 2, the system may comprise one or more first contamination sensor 3a arranged in the container 3 for measuring the amount of one or more micropollutants 1 in the liquid in the container 3. The system may also comprise processing circuitry arranged to receive data input from the one or more first contamination sensor 3a. The data input is representative of the amount of one or more micropollutants 1 in the liquid in the container 3. The processing circuitry is used to control the dosage arrangement 7b, the flow rate, the ratio used/unused MAC and other parameters of the process based on the data input. The one or more contamination sensor 3a and the processing circuitry are thus used to ensure that the amount of MAC and mixture of used magnetic activated carbon 4 and unused magnetic activated carbon 4 to the container 3 is optimised for removing the one or more micropollutants in the liquid.

When the system comprises a first contamination sensor 3a, step b) of the process of providing magnetic activated carbon 4 to the container 3, comprises:
b1) receiving, in a processing circuitry, data input from one or more contamination sensor 3a, whereby the data input is representative of the amount of micropollutants 1 in the liquid in the container 3,
b2) determining, in the processing circuitry, the flow rate of the liquid, dosage of MAC and ratio used/unused MAC 4 required to remove the amount of micropollutants 1 in the liquid in the container 3, and
b3) providing the determined amount of magnetic activated carbon 4 at a determined ratio used/unused MAC to the container 3 and adapting the flow rate based in the data.

In other words, one or more sensors may be used to determine the amount of micropollutants in the liquid which information is used to determine the other parameters in the process, such as flow rate of the liquid or gas, dosage of MAC and ratio used/unused MAC. In this way, the amount of MAC used can be optimized so that there is enough MAC to adsorb the micropollutants but not an excessive amount.

The system may comprise one or more second contamination sensor 5a arranged to measure the amount of micropollutants 1 in the liquid 2 after it has been separated in the magnetic separator 5. The output liquid, after removing the micropollutants with the magnetic activated carbon 4, is thus controlled with the one or more second contamination sensor 5a. By controlling the output liquid, it is possible to adjust the calculations of the processing circuitry when needed. For example, if there are still micropollutants in the output liquid, the flow rate of the liquid, dosage of MAC and ratio used/unused MAC can be adapted.

The one or more first and/or second contamination sensor 3a, 5a may be a sensor for detecting the amount of one or more micropollutant. More than one first and/or second contamination sensor 5a may alternatively be used for detecting the amounts of different micropollutants. The one or more first and/or second contamination sensors 3a, 5a may comprise, for example, a sensor for detecting the amount of per- and polyfluoronated substances, PFASs in the liquid 2. The first and/or second contamination sensor 3*a*, 5*a* may be a sensor for detecting the amount of a pharmaceutical residues. The first and/or second contamination sensor 3*a*, 5*a* may be a sensor for detecting the amount of one or more micropollutants selected from the group comprising or consisting of pharmaceutical residues, pesticides, insecticides, PFASs, such as perfluorooctanoic acid (PFOA), heptafluorobutyric acid (PFBA), nonafluorobutane-a-sulfonic acid (PFBS) perfluorooctanesulfonic acid and perfluorooctanesulfonate (PFOS), or polycyclic aromatic hydrocarbons (PAH), dye, air or gases, such as methane, carbon dioxide, hydrogen, mineral micropollutants, such as gold, arsenic, copper, chromium, lead, mercury, cesium and zinc, or radioactive isomers thereof, or mixtures of micropollutants.

In some aspects, the process and system are automated such that steering of the process can be conducted using an App on a mobile device, such as a mobile phone, for managing the process parameters, such as flow rate of the liquid, dosage of MAC and ratio used/unused MAC.

The mixing of the liquid 2 and the magnetic activated carbon 4 may be done for a predetermined period, whereby the time period depends on the type of pollutant, the concentration of pollutant in the liquid and the acceptance level of the micropollutants in the cleaned liquid. The mixing of the liquid 2 and the magnetic activated carbon 4 for example is done for at least 25 minutes and preferably for at least 30 minutes or at least 1 hour or at least 1 to 10 hours, or at least 5 hours. After this period the vast majority of micropollutants 1 in liquid 2 have been adsorbed to the magnetic activated carbon 4 particles. Shorter periods may be acceptable in case the level of desired adsorbed micropollutants 1 is lower or when the dosage of MAC is increased or the ration used/unused MAC is decreased, or the flow rate decreased. In a continuous system, the mixing period is the period of the presence of MAC in the liquid prior to separating MAC from the liquid or gas.

Figure 6:
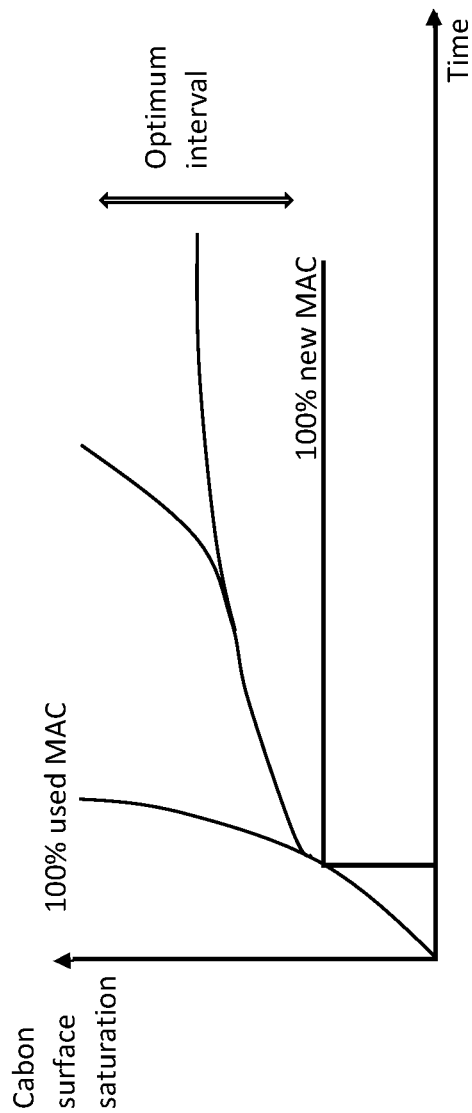
FIG. 6 shows a graph of carbon surface saturation as a function of time for various ratio used/unused MAC at fixed flow rate and dosage.
Figure 7:
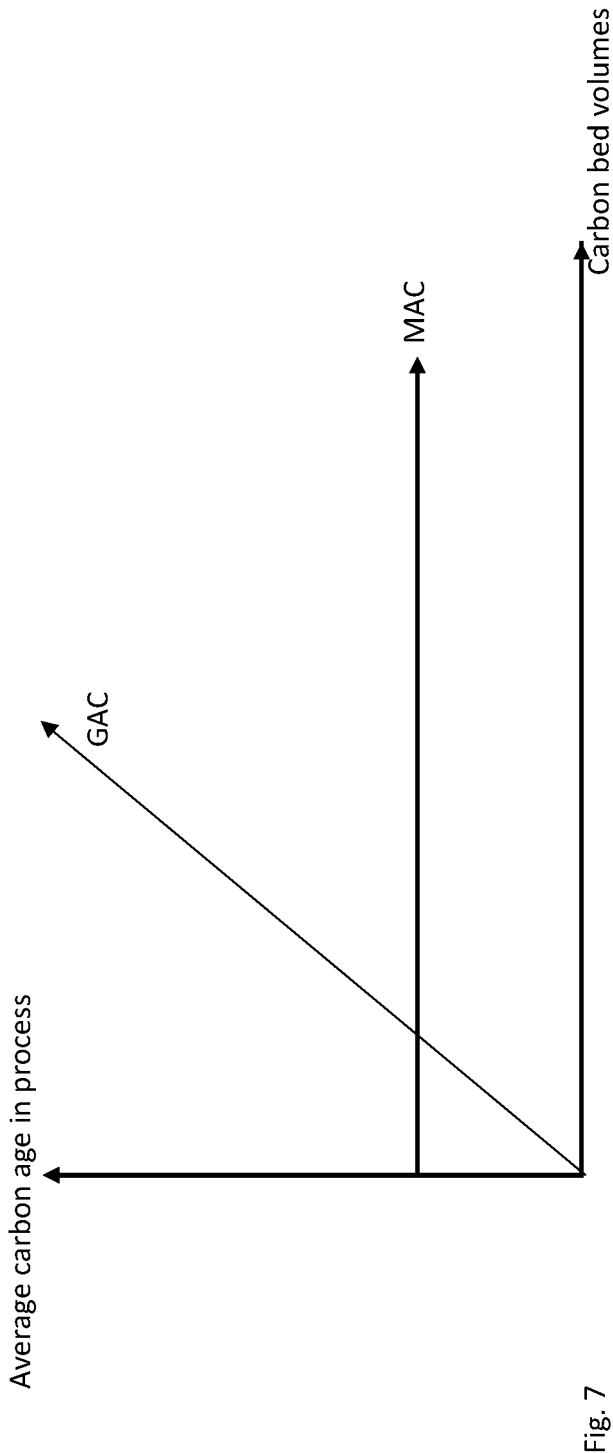
FIG. 7 shows a graph of average carbon age as a function of carbon bed volumes.

The adding of between 1 and 100% unused magnetic activated carbon 4 to the container 3 comprises for example adding the same amount of unused magnetic activated carbon 4 that has been removed from the separated used magnetic activated carbon 4. The amount of magnetic activated carbon 4 is thus kept constant during repeated cycles of removing micropollutants 1. It is possible that a small amount of magnetic activated carbon 4 follows the liquid 2 in step g. Therefore, it may be beneficial to add slightly more magnetic activated carbon 4 than what is removed. FIG. 6 shows the saturation of the carbon surface as a function of time. For recovery of precious metals like gold and silver it may be advantageous to use 100% new MAC constantly. For removal of other micropollutants for which a minimum level of pollution is allowed in the cleaned liquid, the ratio of used/unused MAC can be between 0.1 and 99.99% of new MAC. As can be seen in FIG. 6, the optimum interval of used versus unused MAC will be between 0.1 and 99.99% of new MAC and depend on the type of pollutant, type of liquid, the concentration of pollutant in the liquid and the acceptance level of the micropollutants in the cleaned liquid as well as flow rate and dosage of MAC. The removing may comprise removing between 0.1 to 25%, between 0.1 to 20%, between 0.1 to 15%, or between 0.1 to 10%, or 1 and 5% of the separated used magnetic activated carbon 4 and adding between 0.1 to 25%, between 0.1 to 20%, between 0.1 to 15%, or between 0.1 to 10%, or 1 and 5% unused magnetic activated carbon 4 to the container 3, respectively. FIG. 7 shows the average carbon age versus bed volumes. When using GAC there is a linear relationship between carbon age and bed volume. Carbon from GAC process ages in time. When using the carbon (MAC) in the process of the invention on the other hand, the used carbon is re-circulated, and part of the carbon is replaced by unused carbon. Consequently, the carbon does not age. The contact time (flow rate), dosage of MAC and ratio used/unused MAC can be varied in each circulation of MAC to constantly optimize the removal efficiency of the process.

The amount of changed magnetic activated carbon 4 should be high enough to keep the removal of micropollutants 1 effective and low enough to reuse most of the magnetic activated carbon 4.

The repeating steps a to j, or c to f at least one time may comprise repeating steps a to j, or c to f at least 5 to 20, or 10 to 50 times. If more magnetic activated carbon 4 is exchanged, it may be possible to repeat the steps many times, for example more than 10 times. The amount of unused magnetic activated carbon 4 added could be adjusted automatically in real time based on data from a feed-back loop continuously monitoring adsorption efficiency indicator.

One such indicator may be dissolved organic carbon (DOC). Different type of sensors adapted for specific micropollutants may be used for this purpose as well.

The step of removing the liquid 2 may comprise transferring the liquid 2 to a second container 6 for separated liquid 2 cleaned from micropollutants 1. If the cleaned liquid is water, it may be simply returned to the environment instead of being collected in a container 6.

As shown in FIGS. 3 and 4, the system may comprise a third container 3-2 for mixing liquid or gas 2-2 removed from the container 3-1 with magnetic activated carbon 4-2, and a second magnetic separator 5-2 for separating the used magnetic activated carbon 4-2 from the liquid or gas 2-2.

Thus, the step of removing the liquid or gas 2-1 may comprise transferring the liquid or gas 2-1 to a third container 3-2 for performing the process as defined above in the third container 3-2 for removing remaining micropollutants 1-2 from the liquid or gas 2-1 from the container 3-1.

The process may comprise the step of;
- a-1) providing untreated liquid or gas 2-1 to a container 3-1 adapted to hold a liquid or gas,
- b-1) providing magnetic activated carbon 4-1 to the container 3-1,
- c-1) mixing the liquid or gas 2-1 and the magnetic activated carbon 4-1 in the container 3-1,
- e-1) separating the magnetic activated carbon 4-1 from the liquid or gas 2-1 using a magnetic separator 5-1,
- f-1) removing between 1 and 100% of the separated used magnetic activated carbon 4-1,
- g-1) removing the treated liquid or gas 2-1 to a third container 3-2,
- h-1) providing new untreated liquid or gas 2-1 to the container 3-1,
- i-1) providing the used magnetic activated carbon 4-1 to the container 3-1 without the removed between 1 and 100%,
- j-1) adding between 1 and 100% of unused/fresh magnetic activated carbon 4-1 to the container 3-1 (which is the removed amount of magnetic activated carbon 4-1),
- k-1) repeating steps a to j, or c to f at least one time, and
- a-2) providing liquid or gas 2-2 to a container 3-2 adapted to hold a liquid or gas,
- b-2) providing magnetic activated carbon 4-2 to the container 3-2,
- c-2) mixing the liquid or gas 2-2 and the magnetic activated carbon 4-2 in the container 3-2, e-2) separating the magnetic activated carbon 4-2 from the liquid or gas 2-2 using a magnetic separator 5-2, f-2) removing between 1 and 100% of the separated used magnetic activated carbon 4-2, g-2) removing the treated liquid or gas 2-2, h-2) providing new untreated liquid or gas 2-2 to the container 3-2, i-2) providing the used magnetic activated carbon 4-2 to the container 3-2 without the removed between 1 and 100%, j-2) adding between 1 and 100% of unused/fresh magnetic activated carbon 4-2 to the container 3-2 (which is the removed amount of magnetic activated carbon 4-2), k-2) repeating steps a to j, or c to f at least one time.

In this system, a one or more first contamination sensor 3a may be arranged in the container 3-1, 3-2 for measuring the amount of one or more micropollutants 1-1, 1-2 in the liquid or gas in the container 3-1, 3-2, and a processing circuitry may be arranged to:

receive data input from the one or more first contamination sensor, the data input being representative of the amount of one or more micropollutants 1-1, 1-2 in the liquid or gas in the container 3-1, 3-2, and control the dosage arrangement, the flow rate and the ratio used/unused MAC based on the data input.

In this system, a one or more second contamination sensor 5a may be arranged to measure the amount of micropollutants 1-1, 1-2 in the liquid or gas 2-1, 2-2 after it has been separated in the magnetic separator 5-1, 5-2.

In this system, the step of removing the liquid or gas 2-2 may comprise transferring the liquid or gas 2-2 to a second, second container 6-2 for separated liquid or gas 2-2.

This system may comprise a re-circulation arrangement 7-2 comprising a container 7a-2 for mixing the used magnetic activated carbon 4-2 with unused magnetic activated carbon 4-2 and a dosage arrangement 7b-2 for dosing MAC and adapting the ratio used/unused MAC.

The first system may be used for removal of long chain PFAS and for removal of competing substances that are present in the liquid or gas, such as toluene and the like. The second system may be used for removal of other micropollutants, e.g. short chain PFAS. The MAC used and conditions of the processes in the different container 3-1 and 3-2 can be varied and adjusted independently. This is especially relevant because the concentration of micropollutants in the third container 3-2 is higher compared the concentration of this micropollutant in the first container 3-1.

The micropollutants 1 comprise for example pharmaceutical residues. Liquid 2 is thus cleaned from pharmaceutical residues, which is a major problem in liquid 2 handling. When the liquid or wastewater comprises too many competing substances, the serial process can be used to first remove competing substances and secondly, in the third container 3-2, the micropollutant that the process aims to remove from the liquid, e.g. pharmaceutical residues.

The one or more micropollutants may be selected from dyes, air or gases, such as methane, carbon dioxide, hydrogen, As(V), PFAS, Cu(II), Cr(II), Cr(VI), Cs, Cd(II), Hg, Pb(II), Au, Ag, Zn(II), or mixtures thereof. All these micropollutants are important to remove from liquid to obtain good quality water. Furthermore, the process can be used in the mining industry to extract metals like silver or gold particles from liquid.

The process may be used to separate gases, to purify liquids, for removing pharmaceutical residues from sewage residue water and drinking water, for heterogenic catalyses support, in aquariums and industrial fish farms, in industrial water, in decaffeination processes, for chemical spill cleanup, as decolourization, as odour removal, for purification of nitrogen and methane and/or for cleaning electrodes in fuel cells, super capacitors and batteries.

The disclosure provides a process for removing micropollutants 1 in gas 2. The process comprises:

a) providing untreated gas 2 to a container 3 adapted to hold a gas, b) providing magnetic activated carbon 4 to the container 3, c) mixing the gas 2 and the magnetic activated carbon 4 in the container 3, e) separating the magnetic activated carbon 4 from the gas 2 using a magnetic separator 5, f) removing between 1 and 100% of the separated used magnetic activated carbon 4, g) removing the treated gas 2, h) providing new untreated gas 2 to the container 3, i) providing the used magnetic activated carbon 4 to the container 3 without the removed between 1 and 100%, j) adding between 1 and 100% of unused/fresh magnetic activated carbon 4 to the container 3, k) repeating steps a to j, or c to f at least one time.

All the features of the process using gas are the same as those mentioned above in relation to the process using liquid. The process is preferably performed continuously using sensors and data circuitry to control process parameters, such as flow rate, dosage of MAC and ratio used/unused MAC, etc.

The magnetic activated carbon 4 comprises for example the following properties and/or combination of properties:

a surface area ($S_{BET}$) between 150 and 3000 $m^2/g$, or 250 and 1500 $m^2/g$, or 500 and 1000 $m^2/g$, or 1500 and 2500 $m^2/g$ a total pore volume between 0.050 and 2.0 $cm^3/g$, or 0.250 and 1.5 $cm^3/g$, or 0.50 and 1.5 $cm^3/g$, a micropore volume between 0.005 and 1.5 $cm^3/g$, or 0.050 and 1.2 $cm^3/g$, or 0.50 and 1.0 $cm^3/g$, an iron content between 1 and 20 wt %, or 2 and 10 wt. % of the weight of the magnetic activated carbon 4, and/or a saturated magnetic value between 5 and 20 emu/g, or 8 to 15 emu/g, or 10 and 12.5 emu/g.

The diameter of the particles may be between 15 to 100 nm, or between 20 and 60 nm, or between 30 and 50 nm.

$S_{BET}$ may be calculated using standard expressions for Brunauer-Emmet-Teller (BET) and Langmuir isotherms using uptake of nitrogen at relative pressures of $p/p0=0.06-0.29$ and estimating the total pore volume from the uptake at a $p/p0=0.99$, and using t-plot method to estimate the micropore volume.

The iron content may be measured using atomic absorption spectrophotometry.

The diameter of the particles may be measured by SEM.

MAC has been previously been manufactured from various biomass precursors with a high carbon content, such as glucose, cellulose, lignin and starch. In addition to the type of raw materials, the manufacturing process itself may be another important parameter that needs to be considered when synthesizing MAC. There are different methods for manufacturing MAC. Chemical co-precipitation by adding magnetic composite to commercial Powdered activated carbon, PAC, is a promising approach although a decrease of the functional surface area and blockage of the pores of PAC may occur. Ball-milling processes have been reported to form ultrafine magnetic adsorbents via a physical combination between original material, such as PAC with magnetic composites. Alternatively, a pyrolysis activation process can be used. The synthesis involves the hydrothermal treatment of biomasses as a raw material for making impregnated iron-char composite materials in a single step, followed by an activation process either physical activation or chemical activation. A pyrolysis activation method increases the adsorption capacity of adsorbents with the formation of $Fe_2O_3$, which would leave the adsorbents with lower magnetism properties since $Fe_2O_3$ has lower magnetic properties than $Fe_3O_4$.

High performance porous MAC derived from biomass feedstock has been successfully manufactured using pyrolysis activation process with large surface area and strong magnetism properties because its richness of $Fe_3O_4$ particles.

Characterization of example of produced MAC:
Particle size≈30-50 μm
Surface area≈2000 $m^2/g$
Total pore vol.≥1.00 $cm^3/g$
Micropore vol. 0.54 $cm^3/g$
Mesopore vol. 0.71 $cm^3/g$
Isoelectric point=5.3
Magnetic value=12.1 emu/g The properties of MAC can be adapted depending on the type of micropollutant(s) that need to be removed from the liquid or gas.

The MAC used in the process and system may be manufactured in any matter. Examples of preparation methods may be using biomass selected from the group comprising grass cutting, bio waste from fermentation and composting processes, modified carbohydrates, municipal and industrial bio sludge, amino polysaccharides, spilling from ungulates, algae, sea weed, water hyacinth and bagasse, or mixtures thereof, in a HTC followed by activating using $CO_2$. The HTC process may be performed under acidic conditions. Such a process is described in WO2014/027953, which is hereby incorporated by reference.

Alternatively, MAC may be manufactured by a pyrolysis process of lignin, followed by an activation with a steam treatment at 580° C. for about 10 minutes. Such a process is described in Han T., et al. Science of the Total Environments, 18 Oct. 2019, PII S0048-9697(19)35061-2, which is hereby incorporated by reference.

The process may comprise 1) processing the removed between 1 and 100% of the separated used magnetic activated carbon 4 to remove the adsorbed micropollutants 1.

The process may comprise m) regenerating the used magnetic activated carbon 4 to unused magnetic activated carbon 4. Optionally, if needed, the process may include an additional step m2 for upgrading or re-activating MAC. This can for example be done in a heating process by heating MAC at 800° C. using an activating agent, such as $CO_2$.

In other words, the MAC can be regenerated so that it can be re-used as unused MAC. The regenerated MAC may thus be used when adding unused MAC to the dosage arrangement 7b. Extraction of micropollutants can be done with several methods. Examples of methods for regeneration of activated carbon may be oxidizing regeneration, thermal regeneration, microwave regeneration, ultrasound and biological regeneration. Biological regeneration and oxidizing method may be time-consuming or uneconomic. Although microwave has been utilized to regenerate activated carbon, the application is still very limited. The most widely used regeneration method is thermal regeneration by incineration at very high temperature e.g. >500° C. To degrade the loaded PFASs, a temperature higher than 1000° C. is needed, which is difficult and energy consuming. Chemical regeneration by using organic solvent is an alternative method for regeneration of MAC. Due to the small size of MAC particles and their physical adsorption mechanism, the desorption efficiency of micropollutants 2, such as PFAS, from used MAC can be improved by using a bio-solvent as eluent, such as methanol and ethanol. The solvent may be evaporated and the concentrated micropollutants, such as PFAS can be destroyed and the regenerated MAC obtained can be re-used in several adsorption cycles c to f. The desorption time, type of eluent and MAC/solvent ratio will have effects on recovery efficiency of micropollutants, such as PFAS. The solvent may also be recirculated.

EXPERIMENTAL

A study has been conducted to evaluate the efficiency of using MAC to remove pharmaceutical residues from treated wastewater at Borlänge wastewater treatment plant, WWTP.

The main objective of the study was to develop the synthesis of MAC composite from biomass raw materials and use it as a low-cost adsorbent to remove a mixture of 30 type of pharmaceutical wastes from treated wastewater provided from Borlänge WWTP.

This experimental part is split in two subsections:
1) Lab-Scale Study on Removal of Pharmaceuticals from Treated Wastewater This study was focused on the evaluation of MAC efficiency as adsorbent for wastewater treatment application and the results were compared with commercial powder activated carbon, PAC-Norit GSX, as a reference, for removal of a mixture of thirty types of micropollutants included antibiotic, hormones, PFAS, etc. from Borlänge wastewater directly without any extra pretreatment.

MAC was manufactured by a pyrolysis process of lignin, followed by a KOH activation with $N_2$ and a subsequent steam treatment at 580° C. for about 10 minutes 2) Pilot-Plant Scale Study on Removal of Pharmaceuticals from Treated Wastewater Separator Machine and Water Sample A pilot-plant magnetic separator machine was used for this application. The separator has very strong permanent magnets, in order to prevent carrying magnetic particles away by a stream of liquid. 1 $m^3$ wastewater container (3) was obtained from Borlänge WWTP which is processed via conventional mechanical and biological steps. The wastewater samples were un-filtrated and mixed with MAC before each run.

Results and Discussion

1) Lab-Scale Study on Removal of Pharmaceuticals from Treated Borlänge Wastewater Pharmaceutical residues removal by commercial PAC and MAC from fresh treated wastewater received from Borlänge WWTP without any pre-treatment of the wastewater. The results demonstrated that the removal efficiency % of produced MAC is 96% for 24 pharmaceutical compounds. Sulfamethoxazole, Sertraline and BisphenolA uptake % are slightly below 89, 82 and 78.8% respectively. The separation of commercial PAC from aqueous solution has been carried out using sand filter in order to analyse the sample by high-pressure liquid chromatography, HPLC. Both PAC and MAC remove the pharmaceutical residues from treated wastewater in Borlänge WWTP efficiently.

TABLE I

Lab-scale results of MAC and commercial PAC. Conditions: 100 mg/L adsorbents dose and contact time 60 min.

| Pollutant | Uptake in % using MAC | Uptake in % using PAC |
|---|---|---|
| Azithromycin | 99 | 100.0 |
| Acetamiprid | 99 | 99 |
| Atenolol | 96.8 | 99.1 |
| Benzotriazole | 97.9 | 100.0 |
| Carbamazepine | 95.5 | 98.6 |
| Clarithromycin | 99 | 100 |
| Diclofenac | 96.8 | 98.1 |
| Erythromycin | 97.6 | 98.9 |
| Fluconazole | 90.6 | 91.6 |
| Furosemide | 99.1 | 96.8 |
| Imidacloprid | 97.0 | 97.0 |
| Losartan | 97.7 | 99.4 |
| Methotrexate | nd | nd |
| Metoprolol | 95.4 | 99.4 |
| Naproxen | 98.6 | 98.5 |
| Oxazepame | 96.1 | 97.9 |
| Sertraline | 82.1 | 100.0 |
| Trimethoprim | 97.7 | 99.4 |
| Ciprofloxacin | 100.0 | 100.0 |
| Citalopram | 100.0 | 100.0 |
| Ketoconazole | 100.0 | 100.0 |
| Paracetamol | nd | nd |
| Propranolol | 96.9 | 99.5 |
| Sulfamethoxazole | 89.0 | 93.5 |
| Tramadol | 96.4 | 96.0 |
| Venlafaxine | 98.2 | 96.8 |
| Zolpidem | 100.0 | 100.0 |
| Bisphenol A | 78.8 | 91.5 |
| Estrone | 100.0 | 100.0 |
| Ibuprofen | nd | nd |
| PFOS | nd | nd |
| PFOA | nd | nd |

2) Pilot-Scale Removal of Pharmaceuticals from Treated Borlänge Wastewater

The difference in the colour of the wastewater before and after treatment by 100 mg/L of MAC for 30 or 60 min contact time was compared. Before treatment, the wastewater had a yellow tone and after treatment, the wastewater was clear. The result of overall removal efficiency % of single-stage MAC process was in the range of 80% in pilot-scale.

TABLE 2

Pilot-scale results

| Pollutant | Uptake in % using MAC Pilot-run, 30 min | Uptake in % using MAC Pilot-run, 1 H |
|---|---|---|
| Azithromycin | 57.3 | 90.5 |
| Acetamiprid | 55.5 | nd |
| Atenolol | 82.2 | 96.0 |
| Benzotriazole | 84.8 | 91.6 |
| Carbamazepine | 78.8 | 91.7 |
| Clarithromycin | 48.0 | 51.3 |
| Diclofenac | 50.3 | 50.9 |
| Erythromycin | 45.4 | 42.6 |
| Fluconazole | 68.1 | 62.9 |
| Furosemide | 49.5 | 68.9 |
| Imidacloprid | 72.9 | 86.7 |
| Losartan | 43.2 | 43.0 |
| Methotrexate | nd | nd |
| Metoprolol | 85.0 | 97.1 |
| Naproxen | 53.1 | 86.4 |
| Oxazepame | 66.0 | 80.8 |
| Sertraline | 55.1 | 97.8 |
| Trimethoprim | 81.3 | 94.3 |
| Ciprofloxacin | 55.9 | 96.4 |
| Citalopram | 91.0 | 96.9 |
| Ketoconazole | 46.4 | 95.3 |
| Paracetamol | nd | nd |
| Propranolol | 88.1 | 98.0 |
| Sulfamethoxazole | 47.7 | 31.6 |
| Tramadol | 72.6 | 89.8 |
| Venlafaxine | 71.1 | 86.9 |
| Zolpidem | 57.0 | 83.6 |
| Bisphenol A | 39.1 | 87.5 |
| Estrone | 82.4 | 98.4 |
| Ibuprofen | nd | nd |
| PFOS | 39.7 | nd |
| PFOA | 39.1 | 24.8 |

SUMMARY

This study shows that pharmaceutical residues can be removed from liquid, using MAC in the process of the invention, to provide purified liquid. MAC was produced from biomass feedstock via pyrolysis process and evaluated as an environment-friendly and low-cost green adsorbent for up to 30 different pharmaceutical compounds. By varying the concentration of MAC dose during the adsorption process, a highly efficient removal (%) of pharmaceuticals has been achieved; a 90% by adding 100 mg/L of a MAC dose for 60 min contact time. Based on the results, the technology was operated for a small pilot-scale (30 L volume) in order to evaluate the possibility to apply the process on a larger scale. The result of overall removal efficiency % of single-stage MAC set up in the range of 80% in the pilot-scale. This study shows that transforming biomasses to MAC can be used efficiently. It is a promising low-cost adsorbent for removal of pharmaceutical wastes with 100% separation efficiency of MAC from the liquid media.

Pre-Study on PFASs Sorption

The preliminary study was done to evaluate the adsorption capability of the process to remove mixture of 4 synthetic solutions of the most common PFAS compounds listed by the Swedish national food agency, such as PFOA, PFOS, PFBA and PFBS. This selection is based on the variable perfluoroalkyl chain length and functional groups as target contaminants included in the health advisory limit of the Swedish Government.

Material and Chemicals.

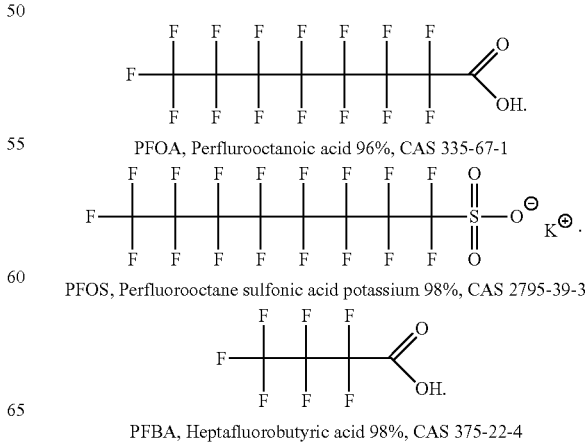

PFOA, Perflurooctanoic acid 96%, CAS 335-67-1

PFOS, Perfluorooctane sulfonic acid potassium 98%, CAS 2795-39-3

PFBA, Heptafluorobutyric acid 98%, CAS 375-22-4

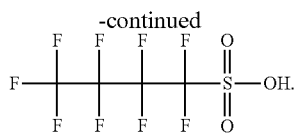

PFBS, Nonafluorobutane-a-sulfonic acid 97%, CAS 375-73-5

The chemicals were purchased from Merck, with the highest purity available. The compounds were selected to embrace short chain and long chain substances included in the health advisory limit of the Swedish Government, with both sulfonic and carboxylic acid headgroups.

Protocol

Two solutions of synthetic water were prepared with a concentration of PFASs for each of the four selected compounds, giving a total concentration of PFASs of 12 μg/L, and respective pH 4.5 and 7.0. The pH of the solution was adjusted with KOH and $HNO_3$.

200 mL of the solutions were mixed with MAC overnight at room temperature. The maximum concentration of MAC is set to 500 mg/L, according to optimum parameters defined prior to the experiment. This concentration of MAC can be adjusted and optimized.

5 samples were sent for analysis:

PFASs 12 μg/L, reference sample, pH 4.5, two test samples after MAC treatment, pH 7.0, two test samples after MAC treatment.

TABLE 3

| | PFASs sorption | | | |
|---|---|---|---|---|
| | Before Treatment | After Treatment | | Removal Efficiency % |
| | Ci | (Ce) pH 4.5 | (Ce) pH 7 | pH 4.5 | pH 7 |
| PFBA | 4700 | 220 | 330 | 95.31914894 | 92.978723 |
| PFOA | 4300 | 490 | 260 | 88.60465116 | 93.953488 |
| PFBS | 2300 | 120 | 58 | 94.7826087 | 97.478261 |
| PFOS | 860 | 230 | 140 | 73.25581395 | 83.72093 |
| total | 12160 | 1060 | 788 | 91.28289474 | 93.519737 |

Figure 8:
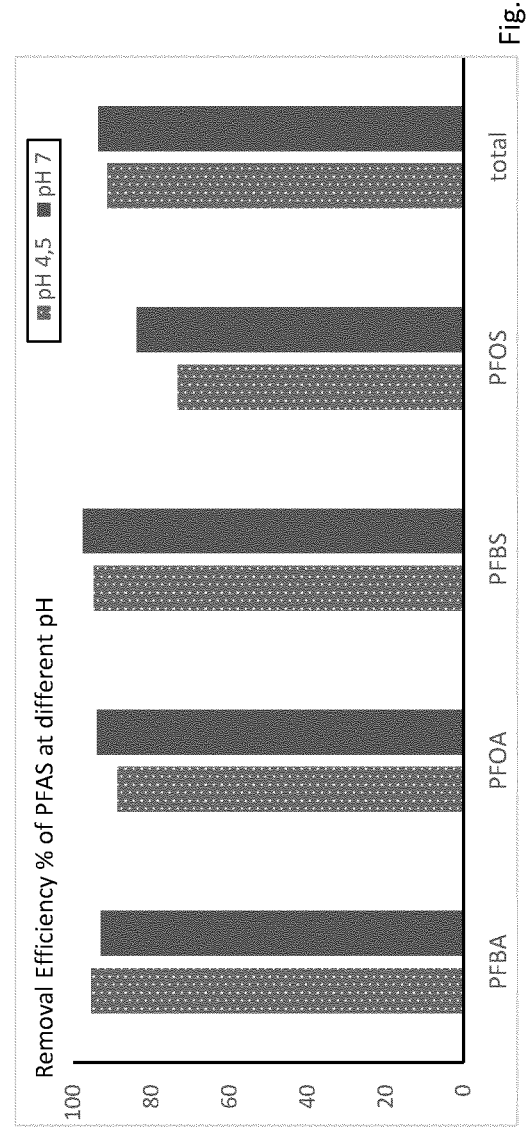
FIG. 8 shows a removal efficiency for PFASs at different pH using the process of the invention.

The results in table 3 and FIG. 8 show that the process of the invention has a removal efficiency of between 91 and 94%. The results also show that the removal efficiency is pH dependent.

Surface Optimization of MAC Particles

If needed, surface functionalization of the material can be performed in order to increases the adsorption capacity of MAC. Parameters could be external chemical conditions such as pH and ionic strength in order to define the optimal experimental conditions, or surface chemistry by grafting of adsorption precursor onto the carbon surface.

Optimization of Adsorption and Desorption Parameters

The contact conditions are optimized by adjusting several parameters such as the concentration of MAC dosage, the flowrate and adsorption capacity of MAC.

Regeneration of the MAC material is achieved by determining right solvent conditions. This process is used to recycle the MAC material and reduces the operative costs. Besides, it provides an easy way to recover and dispose the PFAS compounds Comparison Between MAC and Commercial PAC (Norite GSX) Performance for Removal of PFASs.

Methodology

Two 200 ml of solutions of target PFAS substances were prepared at low concentration (1000 ng/l). pH=6 of solutions has been adjusted by $HNO_3$ and NaOH. One solution (200 mL) was mixed with 500 mg/l of MAC and a second solution (200 mL) was mixed with 500 mg/l PAC. Both solutions were shaken overnight at room temperature.

After treatment, MAC separated from solution using an external magnet in 30 second. PAC separated from solution using sand filter in order to analyze the concentration of PFASs after both treatments.

TABLE 4

| | PFASs removal using MAC and PAC | | | | |
|---|---|---|---|---|---|
| | Ci (ng/l) | MAC Ce (ng/l) | PAC Ce (ng/l) | MAC Removal Efficiency % | PAC Removal Efficiency % |
| PFBA | 250 | 40.00 | 55 | 84 | 78 |
| PFOA | 270 | 5.12 | 6 | 98.1037037 | 97.77777778 |
| PFBS | 280 | 0.74 | 35 | 99.73571429 | 87.5 |
| PFOS | 200 | 8.50 | not detect | 95.75 | 0 |
| Total | 1000 | 54.36 | 96 | 94.564 | 90.4 |

Figure 9:
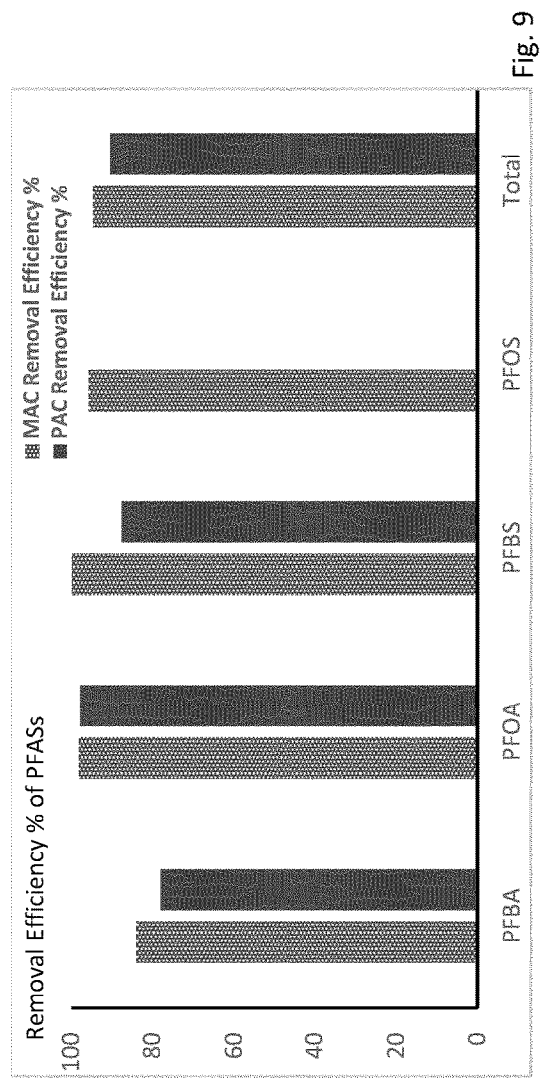
FIG. 9 shows comparison data from MAC and PAC.

The results in table 4 and FIG. 9 show that the removal efficiency is higher for MAC than for PAC. Other advantages of the process of the invention are mentioned above, such as linear PAC process versus circular MAC process of the invention, where MAC is being re-used.

Laboratory Test on Real Water Samples

Based on the obtained results from experiments of MAC as adsorbents to remove PFASs from solutions, the sorption capability of MAC was tested on high contaminated water samples provided from landfill site at Kumla, Sweden. The water is heavy contaminated with PFASs and other pollutants, such as BTEX, aliphatic, aromatic, PAH and heavy metals (As, Cd, Pb . . . etc). The objective of this test to evaluate the adsorption capability of MAC for removal of PFASs from real water in a first stage using the system of the invention and calculate how much PFASs remains for performing a second stage of a serial process.

Methodology 500 ml of wastewater mixed with 500 mg/l of MAC and have shaken overnight at room temperature. Initial pH of water was 7, 6 and final pH after treatment was 8.

TABLE 5

| | Removal efficiency of PFASs from real waster. | | |
|---|---|---|---|
| | Ci (ng/l) | Ce(ng/l) | Removal Efficiency % |
| PFBA | 140 | 140 | 0 |
| PFPeA | 230 | 160 | 30.43478261 |
| PFHxA | 290 | 38 | 86.89655172 |
| PFHpA | 59 | 1.2 | 97.96610169 |
| PFOA | 92 | 4.8 | 94.7826087 |
| PFNA | 10 | 0.3 | 97 |
| PFDA | 10 | 1.1 | 89 |
| PFBS | 1100 | 200 | 81.81818182 |
| PFHxS | 240 | 1.5 | 99.375 |
| PFOS | 3100 | 24 | 99.22580645 |
| 6:2 FTS | 330 | 1 | 99.6969697 |
| Summa PFAS SLV 11 | 5600 | 590 | 89.46428571 |

Figure 10:
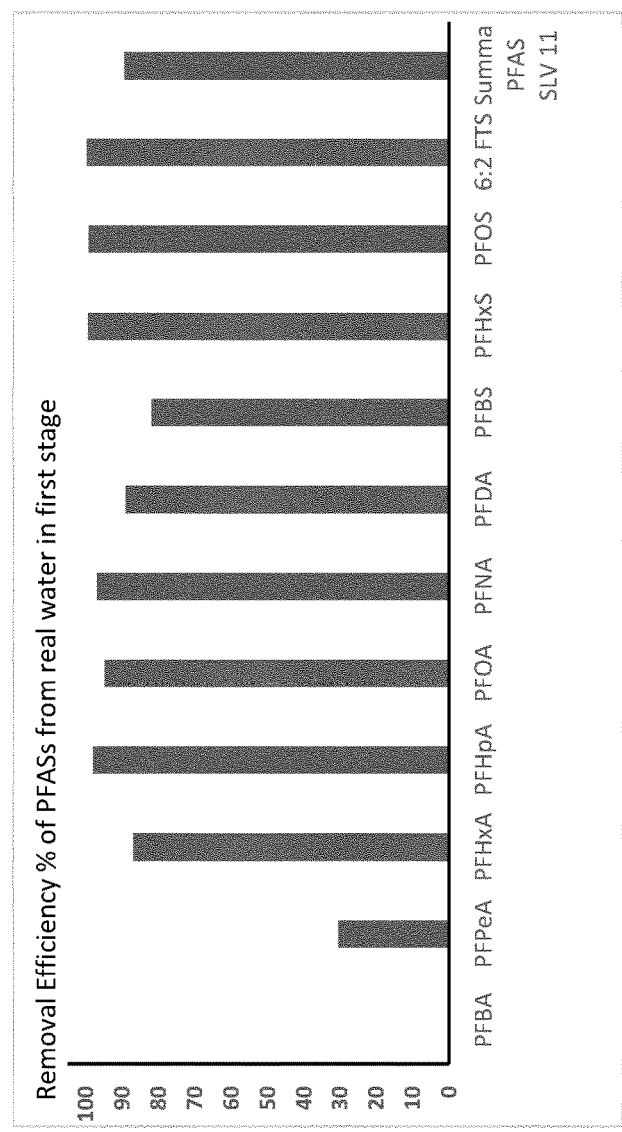
FIG. 10 shows results from laboratory tests on real water samples for removal of PFASs.

The results in table 5 and FIG. 10 show that the process of the invention has a removal efficiency of 90% in a first stage process.

Results demonstrated a 90% removal efficiency of total PFAS substance. Long chain PFASs are well adsorbed on MAC. Most of the 10% remains PFASs are short chain PFAS. Other contaminates were competing on the MAC surface and affected the adsorption of short chain PFASs. In a second stage of a serial system (polishing stage), the focus is on removing the short chain of PFASs and the rest of long chain of PFASs. As shown above, in a second stage of the serial system, the removal efficiency of the process of the invention for PFASs is between 91 and 94%. These combined results show that micropollutants, such as PFASs can be effectively removed by the process of the invention, especially by a serial process of the invention.

Pilot-Plant for Bench Scale

The sorption capacity is quantified in a bench scale. A capacity of 30 L filtrated water from one source is tested with MAC under previously optimized conditions using our magnetic separator system described above. The reusability of MAC is tested in bench scale conditions in order to optimize the number of cycles for which the material could be used before saturation. Bench scale experiments with filtrated real water, including 3 to 5 subsequent contact stages reproducing MAC recirculation are conducted.

Consumption of MAC in the Process

Water circulating per day for wastewater washing is 300 $m^3$ at a flow rate of 13 $m^3/h$ or 208 l/min.

Time in the contact tank 3 is 3 hours, 13×3 is a volume of 40 $m^3$.

The dosage of MAC 4 is 100 mg/l, which is 4 kg of MAC for the process.

90 wt % of MAC is recycled in the first loop (step i) and 10 wt % of MAC is taken out for PFAS washing and regeneration. The amount of MAC taken out of the system is 0.13 kg/h or 3.2 kg/day or 21 kg/week or 1048 kg/year.

The used MAC is cleaned from PFAS and re-generated for re-use in the process.

If the yield of MAC after regeneration is about 50% then 500 kg of MAC is lost per year and needs to be complemented with new MAC.

In a serial process, water is entered into the third contact tank 3-2, preferably at the same flow rate of 13 $m^3/h$. Time in the contact tank 3-3 may be the same or different, e.g. 3 hours, 13×3 is a volume of 40 $m^3$.

90 wt % of MAC is recycled in the first loop (step i-2) and 10 wt % of MAC is taken out for PFAS washing and regeneration. The amount of MAC taken out of the system is 0.13 kg/h or 3.2 kg/day or 21 kg/week or 1048 kg/year for the second process in the series.

The total amount of MAC taken out of the system is than about 2096 kg/year.

The used MAC from the second process is cleaned from PFAS and re-generated for re-use in the process.

If the yield of MAC after regeneration is about 50% then 500 kg of MAC is lost per year per process, i.e. 1000 kg per year in a serial process using two containers 3-1, 3-2, and needs to be complemented with new MAC.

Goldcyanide Removal from the Leachate Liquid

MAC was used for removal of goldcyanide removal from the leachate liquid.

MAC was contacted with the liquid for three days. The sample at the start of the experiment contained 188 μg/l gold. After three days of treatment with MAC, the sample contained 0.399 μg/l gold.

These data show an up-take of >99, 8% of goldcyanide from the leachate liquid using MAC.

The present disclosure is not limited to the embodiments disclosed but may be varied and modified within the scope of the following claims.

REFERENCE LIST

1. Micropollutants
2. Liquid
3. Container
   a. First contamination sensor
4. Magnetic activated carbon, MAC
5. Magnetic separator
   a. second contamination sensor, optionally connected to an App on a computer device, such as a mobile phone
6. Second container
7. Re-circulation arrangement
   a. Container
   b. Dosage arrangement
8. Filter
9. Pump

The invention claimed is:

1. A continuous process for removing micropollutants from liquid by using a system for removing micropollutants from a liquid, the process comprises:
   a) providing a continuous flowing liquid to a container adapted to hold a liquid,
   b) providing magnetic activated carbon (MAC) to the container,
   c) mixing the liquid and the magnetic activated carbon in the container via a recirculation arrangement comprising a container,
   d) transferring the liquid mixed with the magnetic activated carbon to a magnetic separator via pipes,
   e) separating the used magnetic activated carbon from the liquid using the magnetic separator for recirculating the used magnetic activated carbon, thereby preparing a separated, used magnetic activated carbon,
   f) removing between 1 wt % and 10 wt % of the separated, used magnetic activated carbon,
   g) removing the liquid from the separated, used magnetic activated carbon,
   h) providing new liquid to the container,
   i) providing the separated, used magnetic activated carbon to the container of step c) without the removed between 1 and 10 wt %,
   j) adding between 1 wt % and 10 wt % of unused magnetic activated carbon to the container of step c), whereby the separated, used magnetic activated carbon is re-circulated outside the container using the recirculation arrangement comprising the container for mixing the separated, used magnetic activated carbon with unused magnetic activated carbon and a dosage arrangement for dosing the mixed separated, used magnetic activated carbon and unused magnetic activated carbon to the container,
   k) repeating steps a) to j), or c) to f) at least one time.

2. The process according to claim 1, wherein an amount of magnetic activated carbon provided to the container in step b) is between 50 mg and 350 mg per litre of liquid.

3. The process according to claim 1, wherein the step of b) providing magnetic activated carbon to the container, comprises:
   b1) receiving, in a processing circuitry, data input from one or more contamination sensor, the data input being representative of an amount of micropollutants in the liquid in the container, b2) determining, in the processing circuitry, a flow rate of the liquid, a dosage of magnetic activated carbon (MAC) and a ratio of used/unused magnetic activated carbon dosage required to remove the amount of micropollutants in the liquid in the container, b3) providing the determined amount of magnetic activated carbon to the container.

4. The process according to claim 1, wherein the magnetic separator separates the used magnetic activated carbon using an electromagnetic field.

5. The process according to claim 1, wherein the repeating steps a) to j), or c) to f) at least one time comprises repeating steps a) to j), or c) to f) at least 5 times.

6. The process according to claim 1, wherein the adding of between 1 wt % and 10 wt % unused magnetic activated carbon to the container comprises adding the same amount of unused magnetic activated carbon that has been removed from the separated, used magnetic activated carbon.

7. The process according to claim 1, wherein the step of removing the liquid comprises transferring the liquid to a third container for performing the process according to claim 1 in the third container for removing remaining micropollutants from the liquid from the container.

8. The process according to claim 1, wherein the step of removing the liquid comprises transferring the liquid to a second container for removed liquid.

9. The process according to claim 1, whereby the liquid flows at a predetermined and adaptable flow rate through the container of step a), while the magnetic activated carbon is constantly added to the container of step a), mixed and subsequently separated and removed from the liquid using a magnetic separator, and again added to the liquid at a predetermined and adaptable dosage of magnetic activated carbon and at a predetermined and adaptable ratio of used/unused magnetic activated carbon, whereby the magnetic activated carbon is re-circulated outside the container using a recirculation arrangement for dosing the mixed separated, used magnetic activated carbon and unused magnetic activated carbon to the container.

10. The process according to claim 1, wherein the micropollutants are selected from the group comprising: (i) pharmaceutical residues, (ii) pesticides, (iii) insecticides, (iv) Per- and Polyfluoroalkyl Substances (PFASs) comprising perfluorooctanoic acid (PFOA), perfluorobutanoic acid (PFBA), perfluorobutanesulfonic acid (PFBS), perfluorooctanesulfonic acid (PFOS), or polycyclic aromatic hydrocarbons (PAH), (v) dye, (vi) air or gases comprising methane, carbon dioxide, or hydrogen, (vii) mineral micropollutants comprising gold, arsenic, copper, chromium, lead, mercury, cesium and zinc, or radioactive isomers thereof, or (viii) a mixture thereof.

11. The process according to claim 1, further comprising:
l) regenerating the separated, used magnetic activated carbon to unused magnetic activated carbon, and
optionally, m) re-activating the unused magnetic activated carbon.

* * * * *